(12) United States Patent
Berntorp

(10) Patent No.: US 11,474,486 B2
(45) Date of Patent: Oct. 18, 2022

(54) MODEL-BASED CONTROL WITH UNCERTAIN MOTION MODEL

(71) Applicant: Mitsubishi Electric Research Laboratories, Inc., Cambridge, MA (US)

(72) Inventor: Karl Berntorp, Skanor SKA (SE)

(73) Assignee: Mitsubishi Electric Research Laboratories, Inc.

( * ) Notice: Subject to any disclaimer, the term of this patent is extended or adjusted under 35 U.S.C. 154(b) by 869 days.

(21) Appl. No.: 16/298,271

(22) Filed: Mar. 11, 2019

(65) Prior Publication Data

US 2020/0293010 A1    Sep. 17, 2020

(51) Int. Cl.
   *G05B 13/04*    (2006.01)
   *G06N 5/02*    (2006.01)
   *G06N 7/00*    (2006.01)

(52) U.S. Cl.
   CPC .......... *G05B 13/048* (2013.01); *G06N 5/022* (2013.01); *G06N 7/005* (2013.01)

(58) Field of Classification Search
   CPC ........ G05B 13/048; G05B 2219/41146; G06N 5/022; G06N 7/005; G01S 5/0252; G06T 7/246
   See application file for complete search history.

(56) References Cited

U.S. PATENT DOCUMENTS

| | | | |
|---|---|---|---|
| 2015/0348409 A1* | 12/2015 | Lykkja | G01S 19/14 342/357.52 |
| 2018/0217595 A1* | 8/2018 | Kwon | H04L 67/12 |

OTHER PUBLICATIONS

Bastani et al. "Incremental Nonlinear System Identification and Adaptive Particle Filtering Using Gaussian Process" Aug. 2016 (Year: 2016).*

* cited by examiner

*Primary Examiner* — Rehana Perveen
*Assistant Examiner* — Troy A Maust
(74) *Attorney, Agent, or Firm* — Gennadiy Vinokur; Hironori Tsukamoto

(57) ABSTRACT

A system is controlled using particle filter executed to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle. Each execution of the particle filter updates the state of the particle according to a control input to the system and the motion model of the particle with the uncertainty and determines particle weights by fitting the state of the particle in the measurement model subject to measurement noise.

11 Claims, 27 Drawing Sheets

MODEL-BASED CONTROL WITH UNCERTAIN MOTION MODEL

TECHNICAL FIELD

The invention relates generally to model-based control, and more particularly to methods and apparatus for model-based control using a motion model having an uncertainty.

BACKGROUND

Optimization based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites and power generators.

The MPC is based on a real time finite horizon optimization of a model of a system. The MPC has the ability to anticipate future events, and to take appropriate control actions. This is achieved by optimizing the operation of the system over a future finite time-horizon subject to constraints, and only implementing the control over a current time step.

The MPC can predict the change in state variables of the modeled system caused by changes in control variables. The state variables define a state of the system, i.e., a state of a controlled system is a smallest set of state variables in state-space representation of the control system that can represent the entire state of the system at any given time. For example, if a controlled system is an autonomous vehicle, the state variables may include position, velocity and heading of the vehicle. Control variables are inputs to the system designed to change a state of the machine. For example, in a chemical process, the control variables are often pressure, flow, temperature, opening of the valves, and stiffness of dampers. State variables in these processes are other measurements that represent either control objectives or process constraints.

The MPC uses models of the system, the current system measurements, current dynamic state of the process, and state and control constraints to calculate future changes in the state variables. These changes are calculated to hold the state variables close to target subject to constraints on both control and state variables. The MPC typically sends out only the first change in each control variable to be implemented, and repeats the calculation when the next change is required.

The performance of a model-based control inevitably depends on the quality of the prediction model used in the optimal control computation. The prediction models describe the dynamics of the system, i.e., evolution of the system in time. For example, the prediction model is a nonlinear function describing the dynamics of the system to connect previous and current states of the controlled system based on a control input to the system.

However, in many applications the motion model of the controlled system is partially unknown or uncertain. In such cases the application of the control on the uncertain model can lead to suboptimal performances or even to instability of the controlled system. For example, in some situations, some parameters of the motion model are not measured precisely. Thus, the controller may need to estimate unknown parameters of the model of the machine. The conventional approaches to handle such problems include adaptive or learning-based MPC, where an MPC control problem is augmented with a closed-loop identification scheme in order to learn the unknown machine parameters. By learning the unknown parameters, the operation of the machine achieved by the controller is improved. See, e.g., U.S. 2011/0022193.

However, additionally or alternatively to the uncertainty of parameters of the motion model, in some situations, the dynamics of the system are changing, i.e., the functional relationship between the consecutive states of the controlled system. In those situations, adaptive or learning-based method for estimating parameters of the models can be insufficient.

Accordingly, there is a need for a model-based controller that can learn the motion model of dynamics of the control system in real time.

SUMMARY

It is an object of some embodiments to provide a model-based control of a system using a motion model describing dynamics of the system. Additionally or alternatively, it is another object of some embodiments to provide a model-based control of the system using a motion model having an uncertainty. Additionally or alternatively, it is another object of some embodiments to provide a model-based control of the system using a motion model having an uncertainty in the dynamics of the system. Additionally or alternatively, it is another object of some embodiments to estimate a motion model of the controlled system when the parameters and/or dynamics of the motion of the system are unknown and/or partially known. Additionally or alternatively, it is another object of some embodiments to estimate a motion model of the controlled system having non-linear dynamics.

Typically, a system can be modeled with at least two models (equations). The first model is a motion model of the system relating a state of the system to a previous state of the system and an input to the system. The motion model captures the dynamics of the system. The motion model typically includes noise or disturbance representing uncertainty of the motion model and/or models external disturbances. This uncertainty is referred herein as process noise. The second model is a measurement model relating available measurements of the system to the state of the system. The measurement model also includes measurement noise and/or other uncertainties referred herein as measurement noise. Herein, these uncertainties are referred to as model uncertainties.

In addition, the state of the system is also subject to uncertainty, referred herein as a state uncertainty. Notably, the process noise and the measurement noise in combination with the model uncertainty cause the state uncertainty. However, while the state and model uncertainties are tightly connected, they are different from the process and measurement noises. Specifically, the state uncertainty is internal to the values of the state and the model of the system, while the process and measurement noises are external disturbance on the state.

When the process noise, measurement noise, and models are known, i.e., the shape and parameters of the distribution of the process noise and the measurement noise and the nonlinear function describing the models are known, various techniques allow to estimate both the state of the system and the state uncertainty, for instance, using a Kalman filter or a particle filter. Both the state of the system and the state uncertainty are important for a number of control applications. For example, the state of the system can be used to determine a control input to the system to accomplish a control objective, while the state uncertainty can be used to adjust the control input to ensure the feasibility of the control.

For example, when the distributions of the process noise and the measurement noise are known and the motion model and measurement model are known, the particle filter can be used to represent the state of the system and the state uncertainty with a set of particles, wherein the state of the system is a weighted combination of the particles, wherein the weights are determined according to the particles' fit with the measurement model.

However, in several applications the motion model is not known prior to runtime, e.g., for a vehicle driving on a road the surface cannot be sensed unless the vehicle is moving, and any controller is based on a motion model, which in the startup phase is uncertain, or even completely unknown. Additionally or alternatively, the dynamics of the system may be unknown, partially known, or changing over time.

Hence, for some applications there is a need not only to estimate a distribution of a current state of the system, but also to estimate a motion model of the system. To that end, some embodiments estimate the state and the motion model of the system given a previous state, a measurement model, and process and measurement noise perturbing the motion and measurement model, respectively.

Some embodiments are based on recognition that particle filters can estimate the distribution of the state by including in each particle a state and a weight determining the fitting of the state to the measurement using the measurement model. However, an inclusion of the state in a particle can update the state only, not the motion model, because in such an arrangement, the motion model is outside of the particle, i.e., external to the particle, such that all particles are driven by the same motion model.

Some embodiments are based on the understanding that a particle filter can also include in each particle a motion model. In such a manner, the motion model becomes internal to a particle, i.e., each particle would have its own motion model.

In effect, because motions models of different particles can differ, the modified particle filter can update not only the state of the system, but also the motion model of the system.

Some embodiments are based on the realization that in order to include a motion model into each particle, the particle should include a state, a motion model, a measure of the uncertainty of the motion model, and a weight that determines the joint fit of the state and motion model with respect to the measurement model. Doing in such a manner ensures that the weighting of each particle reflects the quality of the motion model.

Some embodiments are based on the realization that the unknown motion model can be regarded as a stochastic uncertainty of the model of the motion of the system. In addition, one embodiment recognizes that there are typically other disturbances acting on the motion of the vehicle, such as uncertainties in the actuators producing the control inputs or other external disturbances. One embodiment is based on the realization that a distribution of motion models can be determined as a weighted combination of possible motion models of each particle, weighted according to the weights of the particles.

Some embodiments are based on realization that an uncertainty of a motion model can be modeled as a Gaussian process over possible motion models of the system. The motion model is a function, often non-linear function describing the evolution of the states. Each sample on the Gaussian process over possible motion models is a sampled motion model. Because the parameters of the Gaussian process, such as mean and variants of the Gaussian process capture the uncertainty of the motion model, the sampled motion model represents the uncertainty. To that end, when at least one of the motion model and measurement model is unknown, some embodiments model the motion model using a Gaussian process which is a distribution over functions of the state.

Some embodiments are based on recognition that to update the motion model there is a need to update the Gaussian process, which is a computationally challenging problem. However, some embodiments are based on the understanding that a Gaussian process can be modeled as a set of weighted basis functions, wherein the weights are distributed according to a Gaussian distribution. Doing in such a manner considerably simplifies the learning problem, since the problem of learning the model is reduced to learning the weights of the respective basis function. In other words, to update Gaussian process some embodiments can just update these Gaussian distributions of weights, and to determine a motion model some embodiments can just determine N scalar weights from Gaussian distribution. In effect, regarding the motion model as a weighted combination of basis functions significantly decreases the computational requirements for estimating the tire friction in probabilistic manner.

Some embodiments are based on the realization that the weights of the basis functions can be modeled as a matrix, herein referred to as weight matrix, that is Matrix-Normal distributed, which is a distribution where the matrix is sampled from a Gaussian distribution. One embodiment realizes that when the model is unknown and the variance of the Gaussian distribution of the process noise and/or the measurement noise is unknown, the joint distribution of the weight matrix and the distribution of the process noise and/or the measurement noise should be Student-t distribution, wherein the mean matrix of the Student-t distribution is dependent on the parameters describing the weight matrix, and wherein the scale matrix of the Student-t is dependent on the parameters describing the weight matrix and noise covariance. This is because, the Student-t distribution can better capture the uncertainty of the unknown variance of the Gaussian distribution.

Some embodiments are based on the realization that the state of the system can be jointly estimated with the model and noise uncertainty by recursively sampling at least one sample from the Student-t distribution, scoring the particles according to the consistence with the measurement, and update the parameters of the weight matrix and noise uncertainty using the states generated by sampling from the Student-t distribution.

One embodiment realizes that different control methods use different assumptions about the state uncertainty. For instance, many control systems, such as Linear Quadratic Gaussian controllers (LQG), rely on a Gaussian assumption of the process and measurement noise to provide stability guarantees. Consequently, one embodiment generates different distributions from the sampled states. For instance, one embodiment fits a Gaussian distribution to the sampled states.

As time progresses, the Student-t distribution approaches the Gaussian. One embodiment is based on the understanding that it can be beneficial to avoid this merging. Consequently, the embodiment restricts the parameters of the Student-t distribution such that the Student-t and Gaussian are sufficiently close to each other, but not exactly the same.

Accordingly, one embodiment discloses an apparatus for controlling a system, including a memory configured to store a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise; and a processor configured to execute the particle filter to produce the weight of each particle and the state of each particle determined with the uncertainty of the motion model of each particle; update the distribution of the Gaussian process of a particle based on a difference between the state of the particle determined with the uncertainty of the motion model of the particle and a state of the particle determined without the uncertainty of the motion model of the particle; determine a current estimate of the motion model as a weighted combination of the motion models of the particles weighted according to the weights of the particles; determine a current estimate of the state of the system as a weighted combination of the states of the particles weighted according to the weights of the particles; and execute a controller configured to generate a value of the control input based on the current estimate of the motion model and the current estimate of the state of the system and control the system using the value of the control input.

Another embodiment discloses a method for controlling a system, wherein the method uses a processor coupled to a memory storing a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise, wherein the processor is coupled with stored instructions implementing the method, wherein the instructions, when executed by the processor carry out steps of the method, including executing the particle filter to produce the weight of each particle and the state of each particle determined with the uncertainty of the motion model of each particle; updating the distribution of the Gaussian process of a particle based on a difference between the state of the particle determined with the uncertainty of the motion model of the particle and a state of the particle determined without the uncertainty of the motion model of the particle; determining a current estimate of the motion model as a weighted combination of the motion models of the particles weighted according to the weights of the particles; determining a current estimate of the state of the system as a weighted combination of the states of the particles weighted according to the weights of the particles; and executing a controller configured to generate a value of the control input based on the current estimate of the motion model and the current estimate of the state of the system and control the system using the value of the control input.

Yet another embodiment discloses a non-transitory computer readable storage medium embodied thereon a program executable by a processor for performing a method, the medium stores a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise. The method includes executing the particle filter to produce the weight of each particle and the state of each particle determined with the uncertainty of the motion model of each particle; updating the distribution of the Gaussian process of a particle based on a difference between the state of the particle determined with the uncertainty of the motion model of the particle and a state of the particle determined without the uncertainty of the motion model of the particle; determining a current estimate of the motion model as a weighted combination of the motion models of the particles weighted according to the weights of the particles; determining a current estimate of the state of the system as a weighted combination of the states of the particles weighted according to the weights of the particles; and executing a controller configured to generate a value of the control input based on the current estimate of the motion model and the current estimate of the state of the system and control the system using the value of the control input.

DETAILED DESCRIPTION

It is an object of some embodiments to provide a model-based control of a system using a motion model describing dynamics of the system. Additionally or alternatively, it is another object of some embodiments to provide a model-based control of the system using a motion model having an uncertainty. Additionally or alternatively, it is another object of some embodiments to provide a model-based control of the system using a motion model having an uncertainty in the dynamics of the system. Additionally or alternatively, it is another object of some embodiments to estimate a motion model of the controlled system when the parameters and/or dynamics of the motion of the system are unknown and/or partially known. Additionally or alternatively, it is another object of some embodiments to estimate a motion model of the controlled system having non-linear dynamics.

Typically, a model of the system includes at least two models (equations). The first model is a motion model of the system relating a state of the system to a previous state of the system and an input to the system. The motion model typically includes noise or disturbance representing uncertainty of the motion model and/or models external disturbances. This uncertainty is referred herein as process noise. The second model is a measurement model relating available measurements of the system to the state of the system. The measurement model also includes measurement noise and/or other uncertainties referred herein as measurement noise.

An example of the motion model is $x_{k+1}=f(x_k, u_k)+w_k$, wherein $w_k$ is the process noise and $f(x_k, u_k)$ is the nonlinear function describing the relation between the current state and control input with the next state. Also, an example of the measurement model is $y_k=h(x_k, u_k)+e_k$, wherein $e_k$ is the measurement noise and $h(x_k, u_k)$ is the nonlinear function describing the relation between the current state and control input with the current measurement.

An example how to describe the uncertainty of the motion model and measurement model is to model the models as samples from a Gaussian process prior $f(x_k) \sim \mathcal{GP}(0, \kappa_\theta(x_k, x'_k))$ for a suitable covariance function $\kappa_\theta(x, x')$ subject to hyperparameters $\theta$. Herein, these uncertainties are referred to as model uncertainties. In addition, the state of the system is also subject to uncertainty, referred herein as a state uncertainty. Notably, the process noise and the measurement noise in combination with the model uncertainty cause the state uncertainty. However, while the state and model uncertainty are tightly connected, they are different from the process and measurement noises. Specifically, the state uncertainty is internal to the values of the state and the model while the process and measurement noises are external disturbance on the state.

Figure 1A:
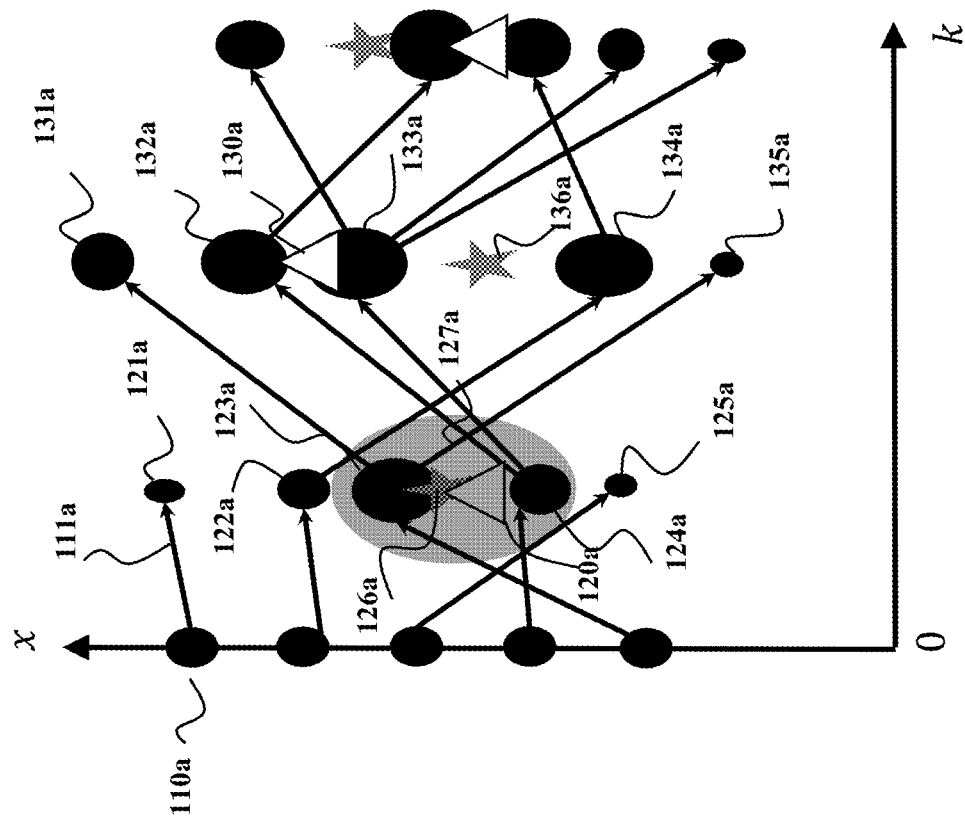
FIG. 1A shows a schematic of the particle filter used by some embodiments.

FIG. 1A shows a schematic of the particle filter (PF) used by some embodiments. The PF is a tool for state estimation in nonlinear state-space models with stochastic, possibly non-Gaussian, process and measurement noise. The PF recursively estimates the distribution of the state using the measurements at each time step, by propagating particles forward in time, wherein a particle includes a state hypothesis and a weight determining the consistence of the state with the measurement using a measurement model. FIG. 1A shows simplified schematic of the result of three iterations of generating a state trajectory when five particles are generated for each iteration. The initial state 110a is predicted forward in time 111a using the model of the motion and the inputs to the system, to produce five next states 121a, 122a, 123a, 124a, and 125a. The probabilities are determined as a function of the measurement 126a and the model of the noise source. At each time step, i.e., at each iteration, an aggregate of the probabilities is used to produce an aggregated state 120a. For the next iterations, the subsequent predictions 127a and measurement 126a propagate the states 131a, 132a, 133a, 134a, and 135a forward in time.

Figure 1B:
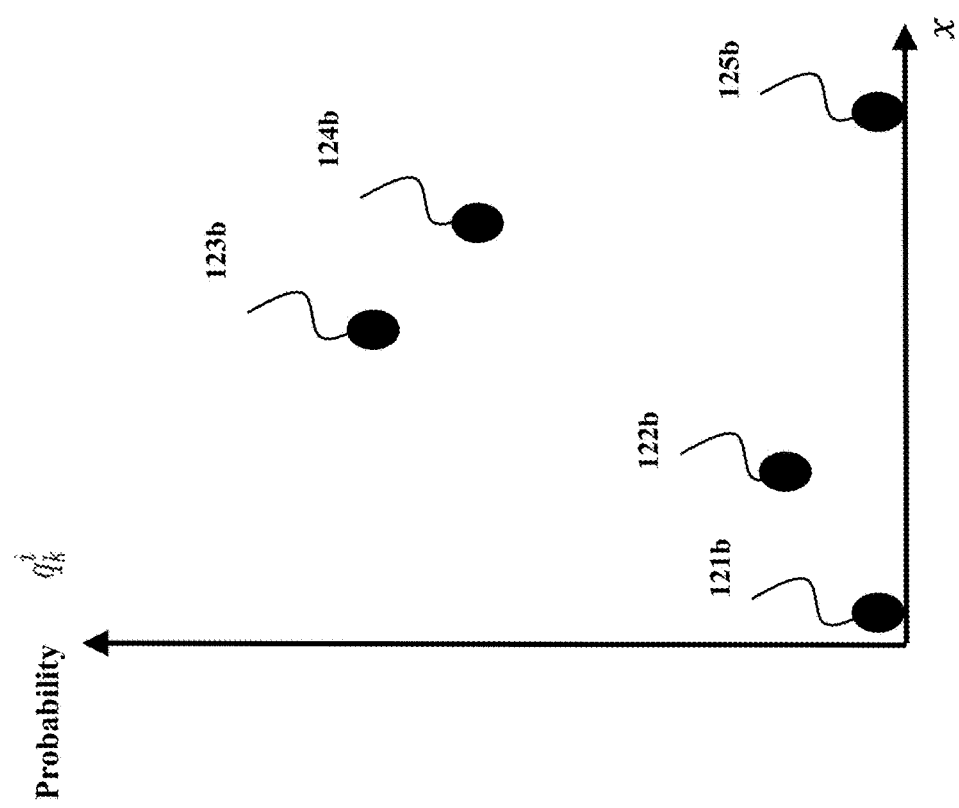
FIG. 1B shows possible assigned probabilities of the five states at the first iteration in FIG. 1A.

FIG. 1B shows possible assigned probabilities of the five states at the first iteration in FIG. 1A. Those probabilities 121b, 122b, 123b, 124b, and 125b are reflected in selecting the sizes of the dots illustrating the states 121a, 122a, 123a, 124a, and 125a. For instance, the state 123a has the highest probability 123b, because it is the most consistent with the measurement when comparing the measurement with the state inserted into the measurement model. Similarly, states 121a and 125a have the lowest weights 121b and 125b, respectively, because these are the least consistent with the measurement when inserting the respective state into the measurement model.

Typically the particles in the particle filter include a state hypothesis and the weight indicating the quality of the state hypothesis. However, this assumes that the motion model of the system is known, because this is needed to generate the state hypotheses in the first place.

Figure 1C:
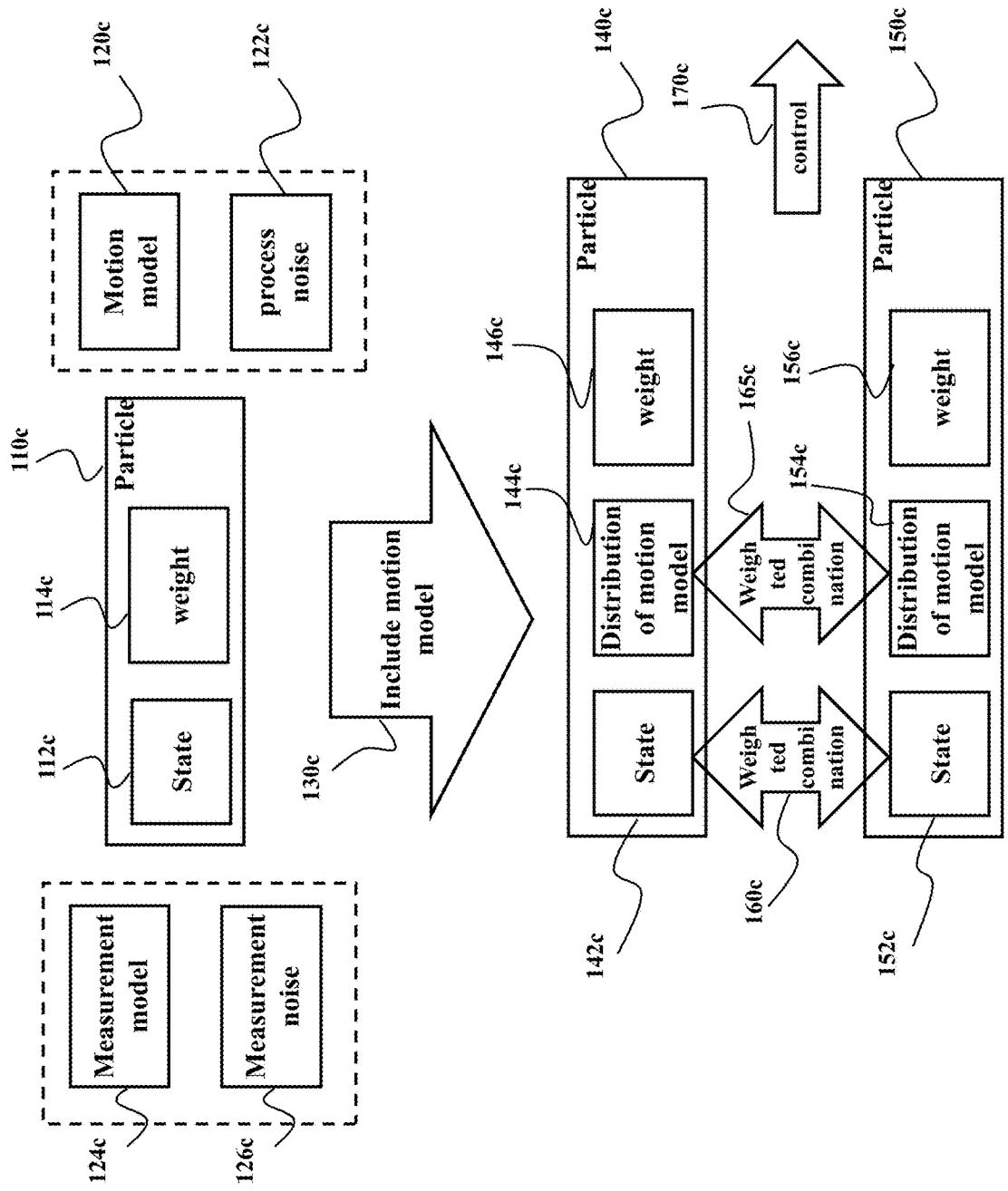
FIG. 1C shows a schematic of a particle filter modified according to some embodiments.

FIG. 1C shows a schematic of a particle filter modified according to some embodiments. Some embodiments are based on recognition that particle filters can estimate the distribution of the state by including in each particle 110c a state 112c and a weight 114c for determining the fitting of the state 112c to the measurement using the measurement model 124c subject to measurement noise 126c. However, an inclusion of the state in a particle can update the state only, not the motion model 120c, because in such an arrangement, the motion model 120c is outside of the particle 110c, i.e., external to the particle, such that all particles are driven by the same motion model 120c subject and the stochastic uncertainty comes from the process noise 122c. In such a manner, the external to the particles motion model 120c remains unchanged.

Some embodiments are based on the understanding that a particle filter can also include 130c in each particle a motion model. In such a manner, the motion model becomes internal to a particle, i.e., each particle would have its own motion model. For example, a particle 140c can include a motion model 144c, while a particle 150c can include a motion model 154c. In effect, because motions models of different particles can differ, the modified particle filter can update not only the state of the system, but also the motion model of the system.

Some embodiments are based on realization that in order to include a motion model into each particle, the particle should include a state 142c and 152c, a motion model 144c and 154c, a measure of the uncertainty of the motion model, and a weight 146c and 156c that determines the joint fit of the state and motion model with respect to the measurement model 124c. Doing in such a manner ensures that the weighting of each particle 140c and 150c reflects the quality of the motion model.

Some embodiments are based on realization that an uncertainty of a motion model can be modeled as a Gaussian process over possible motion models of the system. The motion model is a function, often non-linear function describing the evolution of the states. Each sample on the Gaussian process over possible motion models is a sampled motion model. Because the parameters of the Gaussian process, such as mean and variants of the Gaussian process capture the uncertainty of the motion model, the sampled motion model represents the uncertainty. To that end, when at least one of the motion model and measurement model is unknown, some embodiments model the motion model using a Gaussian process which is a distribution over functions of the state.

Hence, in some embodiments, the motion models 144c and 154c are included in different particles as a distribution of the motion models, i.e., a motion model having an uncertainty modeled as a Gaussian process over possible motion models of the system. Hence, different particle can have different motion models by having different distributions. For example, in some embodiments, a distribution of the Gaussian process of the motion model of one particle is different from a distribution of the Gaussian process of the motion model of at least one other particle.

Some embodiments are based on the realization that the unknown motion model can be regarded as a stochastic uncertainty of the model of the motion of the system. In addition, one embodiment recognizes that there are typically other disturbances acting on the motion of the vehicle. For instance, due to uncertainties in the actuators producing the control inputs, or other external disturbances.

One embodiment is based on the realization that a distribution of motion models can be determined as a weighted combination of possible motion models of each particle, weighted according to the weights of the particles.

Some embodiments are based on the understanding that the particle filter can output both an estimate of the state of the system and an estimate of the model of the system to a model-based controller. Doing in such a manner, it is possible to generate, at each time step of control, new control inputs based on the estimated motion model. For example, each execution of the particle filter updates the state of each particle according to a control input to the system and the motion model of the particle with the uncertainty, and determines the weight of each particle by fitting the state of the particle in the measurement model subject to measurement noise. Each particle has its own state, its own motion model, and its own weight. Hence, a current estimate of the state of the system can be determined as a weighted combination 160c of the states of the particles weighted according to the weights of the particles. Similarly, a current estimate of the motion model can be determined as a weighted combination 165c of the motion models of the particles weighted according to the weights of the particles. Accordingly, the control 170c of the system can be generated based on the current estimate of the motion model and the current estimate of the state of the system.

Figure 2A:
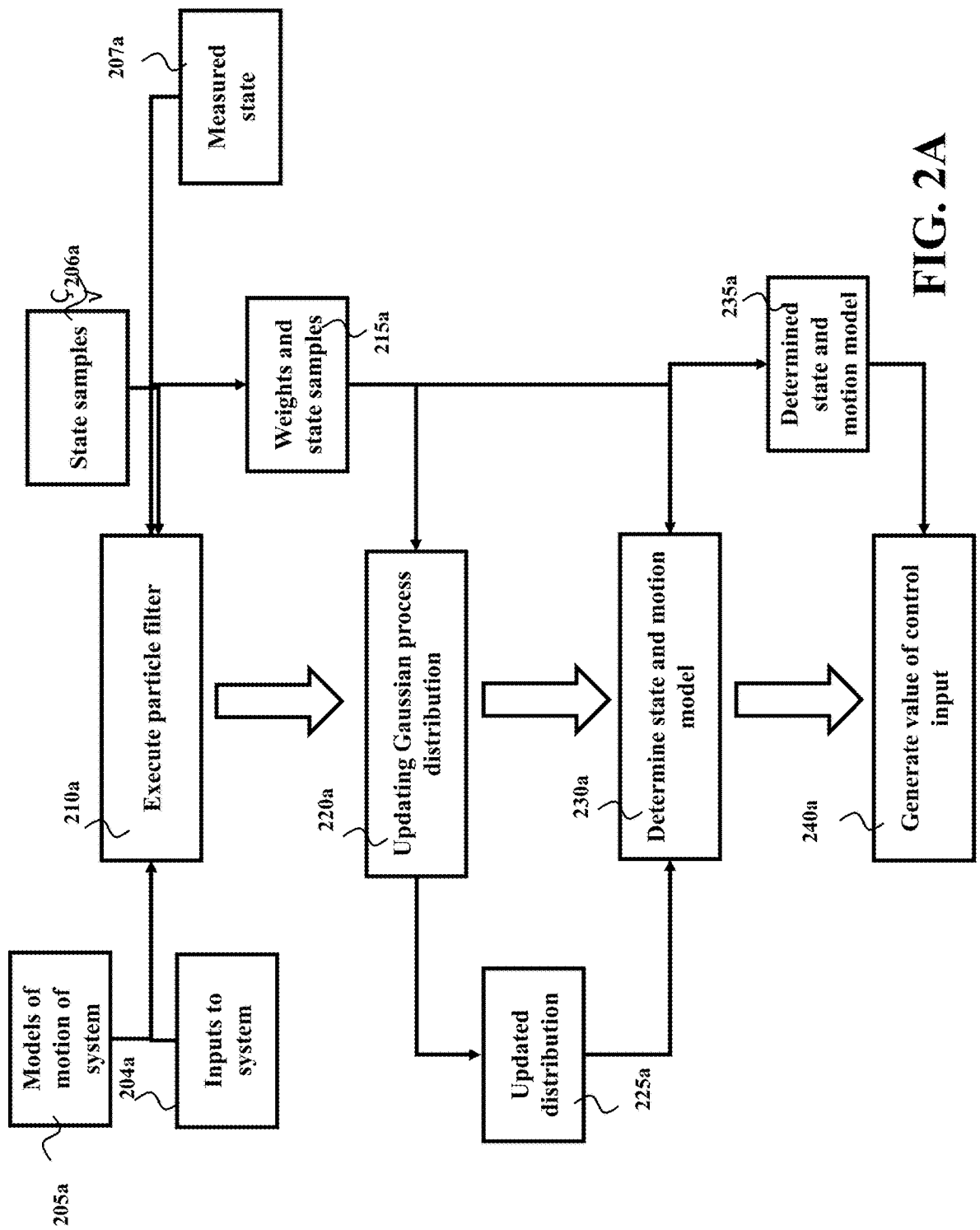
FIG. 2A shows a flowchart for an iteration of method for controlling a system according to some embodiments.

FIG. 2A shows a flowchart for an iteration of method for controlling a system according to some embodiments. The method retrieves from a memory a memory configured to store a particle filter configured to estimate weights of a set of particles based on fitting of the particles into a measurement model, wherein a particle includes a motion model of the system with an uncertainty modeled as a Gaussian process over possible motion models of the system and a state of the system determined with the uncertainty of the motion model of the particle, wherein a distribution of the Gaussian process of the motion model of at least one particle is different from a distribution of the Gaussian process of the motion model of at least one another particle, wherein each execution of the particle filter updates the state of the particle according to a control input to the system and the motion model of the particle with the uncertainty, and determines the weight of the particle by fitting the state of the particle in the measurement model subject to measurement noise.

Specifically, the method retrieves the models of motion 205a of the vehicle and the state samples 206a. Each state sample 206a is associated with a model 205a of motion of the vehicle to form a particle. The method also obtains a control input 204a determined during a previous iteration and obtains the current measurement 207a to execute 210a a particle filter to produce 215a the weight and states corresponding to the weights of the states of the particles. Then the method updates 220a the Gaussian process distribution to produce an updated distribution 225a of the motion model for each particle. Using the updated distribution 225a of each particle, the method determines 230a a current estimate of the motion model and the state of the system. Finally, the determined state and motion model 235a is used when executing a controller that using the determined state and motion model 235a, generates 240a a value of the control input based on the current estimate of the motion model and the current estimate of the state of the system and control the system using the value of the control input.

Figure 2B:
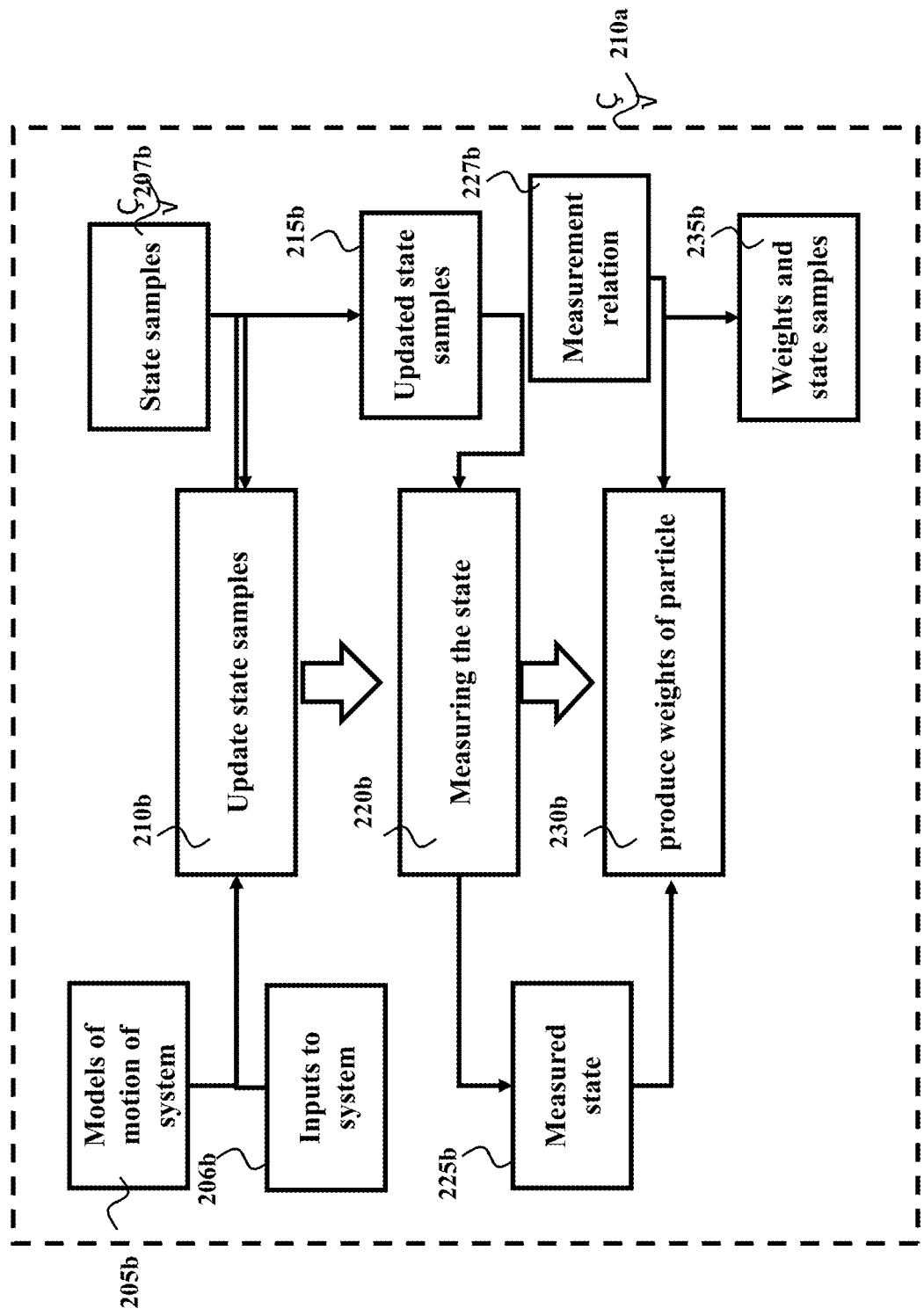
FIG. 2B shows a flowchart of an execution of one iteration of the particle filter according to one embodiment.

FIG. 2B shows a flowchart of an execution of one iteration of the particle filter according to one embodiment. Using the models of motion 205b of the vehicle, the control input 206b determined during a previous iteration, the state samples 207b, wherein each state sample 207b is associated with a motion model 205b of motion of the vehicle, the particle filter updates 210b the state samples according to the respective motion model of the vehicle. In some embodiments, the motion model 205 is represented with a distribution over states. In those embodiments, the method samples the distribution to produce a sampled motion model and update the state of each particle with the corresponding sampled motion model. Then, the particle filter measures 220*b* the state to produce a measured state 225*b*. Using the measured state 225*b* and a measurement relation 227*b* relating the state to the measured state, the particle filter determines 230*b* weights and state samples 235*b*.

In some embodiments, a current estimate of the motion model and the state of the system is determined as a weighted combination of the motion models of the particles weighted according to the weights of the particles. In one embodiment, the weighted combination is the mean, wherein each motion model and each state are weighted according to their weight. In another embodiment, the weighted combination is the maximum estimate, i.e., the motion model and state of the system with the largest weight and the rest being zero, is taken as the weighted combination.

Updating 220*a* the Gaussian process distribution of each particle can be done in several ways. In one embodiment, the updating is done by updating the parameters defining the Gaussian process distribution based on a combination of a state of the particle sampled with the uncertainty of the motion model and a state of the particle determined without the uncertainty of the motion model of said particle, and the parameters determined in a previous iteration.

Figure 2C:
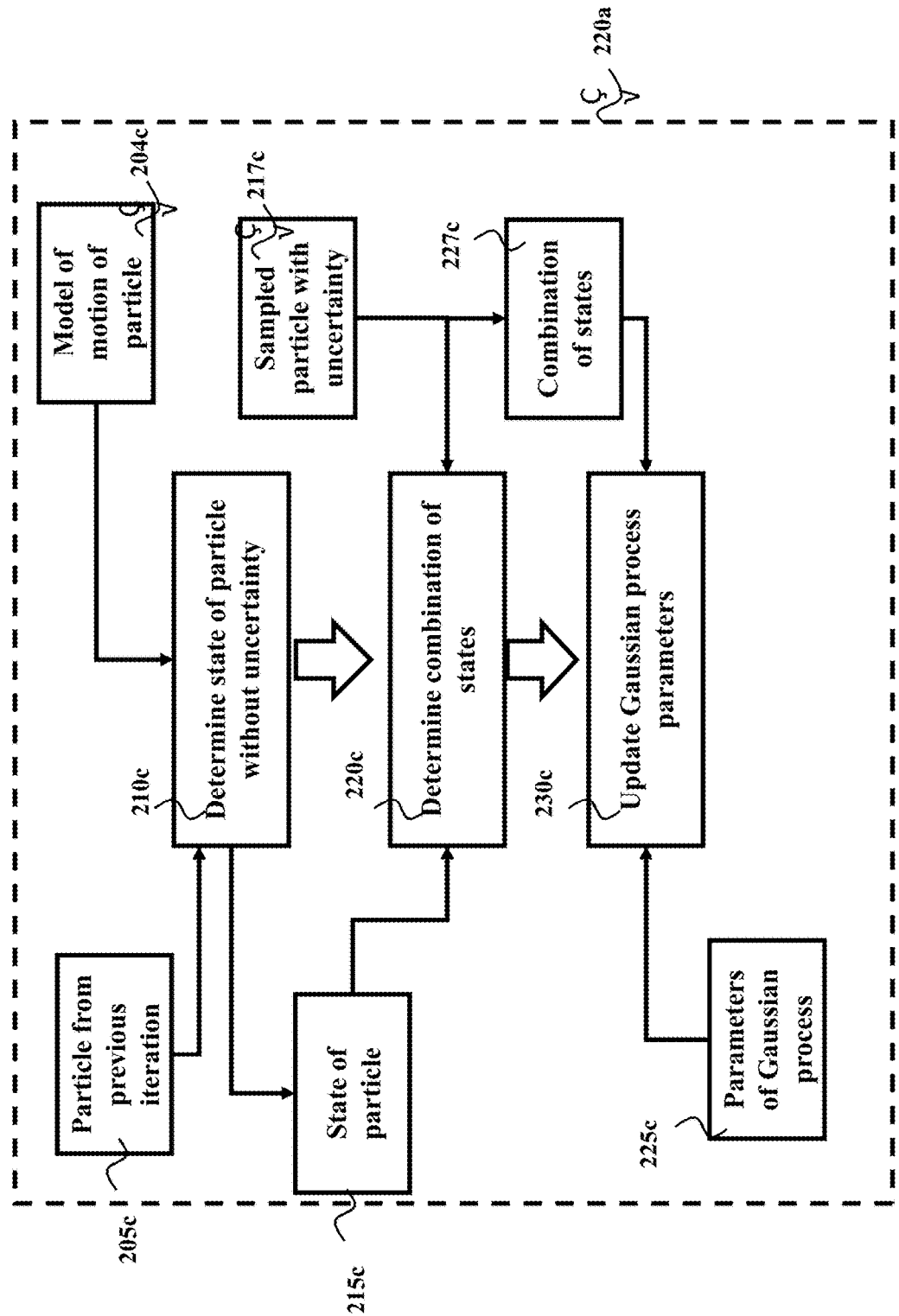
FIG. 2C shows a flowchart for how to update the Gaussian process distribution for each according to one embodiment.

FIG. 2C shows a flowchart for how to update 220*a* the Gaussian process distribution for each particle according to one embodiment. Using the model of motion of a particle 204*c* and a particle 205*c* determined during a previous iteration, i.e., the state, the distribution of the motion model, and the weight of the particle, the method determines 210*c* a current state 215*c* of the particle of the system without the uncertainty of the motion model, i.e., a point estimate of the motion model. Thus, in order to determine the current state without the uncertainty of the system, some embodiments choose the mean of the distribution of the motion model as the motion model.

Then, using the determined current state 215*c* without the uncertainty of the motion model and the sampled state 217*c* with the uncertainty of the motion model, the method determines 220*c* a combination of a state of the particle sampled with the uncertainty of the motion model and a state of the particle determined without the uncertainty of the motion model of said particle. Using the combination of states 227*c* and the parameters 225*c* of the Gaussian process determined during a previous iteration, the method updates 230*c* the Gaussian process parameters as a combination of the parameters 225*c* and the combination of states 227*c*.

Sampling a particle is sampling from a proposal distribution $x_k \sim \pi(x_k|x_{0:k}-1, y_{0:k})$, where the proposal distribution $\pi$ is a user defined distribution including the motion model. For instance, in one embodiment the sampling a particle is sampling from the motion model according to the predictive density, $\pi(x_k|x_{0:k-1}, y_{0:k}) = p(x_k|x_{0:k-1}, y_{0:k-1})$, but a multitude of other alternatives are possible. In one embodiment, updating a state of the particle determined without the uncertainty is updating the state using the motion model $x_{k+1} = f(x_k)$, wherein the motion model f is the mean of the distribution of motion models, and updating a Gaussian process is updating the mean function and covariance function of said Gaussian process as a weighted combination of the mean and the combination of states.

Figure 2D:
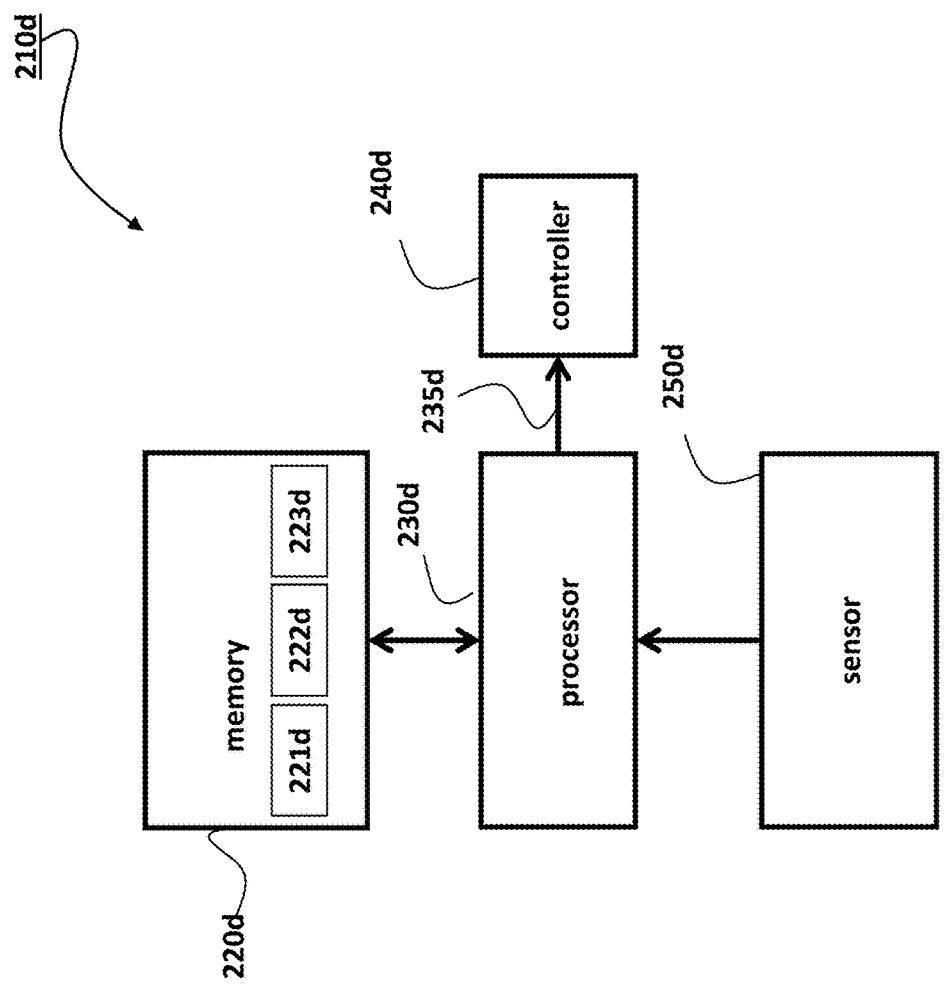
FIG. 2D shows a block diagram of an apparatus for controlling a system according to some embodiments.

FIG. 2D shows a block diagram of an apparatus 210*d* for controlling a system according to some embodiments. The apparatus includes a memory 220*d* to store a set of particles, wherein each particle includes a model 221*d* of the system having an uncertainty, a state of the system 222*d* determined with the uncertainty of the motion model, and a weight 223*d* that determines the joint fitting of the model and state to the measurement.

The apparatus 210*d* also includes a sensor 250*d* to measure a signal to produce a sequence of measurements indicative of a state of the system, a processor 230*d* configured to; execute a particle filter produce the weight of each particle and the state of each particle determined with the uncertainty of the motion model of each particle; update the distribution of the Gaussian process of a particle based on a difference between the state of the particle determined with the uncertainty of the motion model of the particle and a state of the particle determined without the uncertainty of the motion model of the particle; determine a current estimate of the motion model as a weighted combination of the motion models of the particles weighted according to the weights of the particles determine a current estimate of the state of the system as a weighted combination of the states of the particles weighted according to the weights of the particles; and execute 235*d* a controller 240*d* configured to generate a value of the control input based on the current estimate of the motion model and the current estimate of the state of the system and control the system using the value of the control input.

Some embodiments are based on realization of a manner of simplification the estimation of the Gaussian process to determine the motion model. Specifically, in some embodiments, the Gaussian process is regarded as a weighted combination of a finite number of basis functions, wherein each basis function is a function of the system state, and Gaussian process of the motion model is captured by Gaussian distributions of weights of basis function. In other words, to update Gaussian process some embodiments can just update these Gaussian distributions of weights, and to determine the motion model some embodiments can determine a weighted combination using these N scalar weights from Gaussian distribution. In effect, regarding the motion model as a weighted combination of basis functions significantly decreases the computational requirements for estimating the motion model in probabilistic manner, which is crucial for real-time implementations.

Figure 3A:
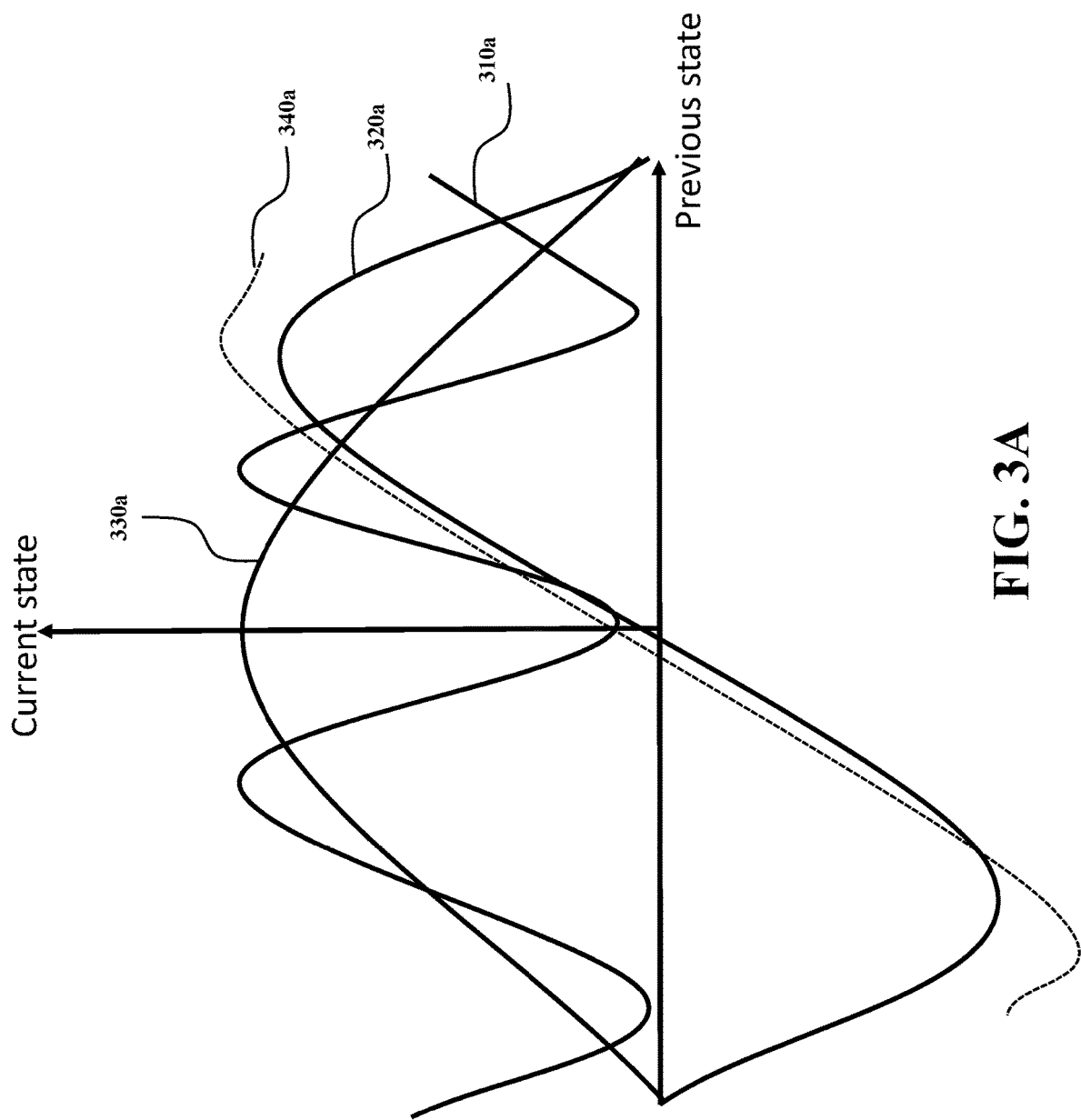
FIG. 3A shows an illustration of the use of weighted basis functions according to one embodiment.

FIG. 3A shows an illustration of the use of weighted basis functions according to one embodiment. In the illustration, there are three basis functions 310*a*, 320*a*, and 330*a*. Also shown is the true motion model 340*a* that maps a previous state to a current state. By combining the basis functions and using different weights for each basis function, they can be combined to reproduce the true motion model.

Figure 3B:
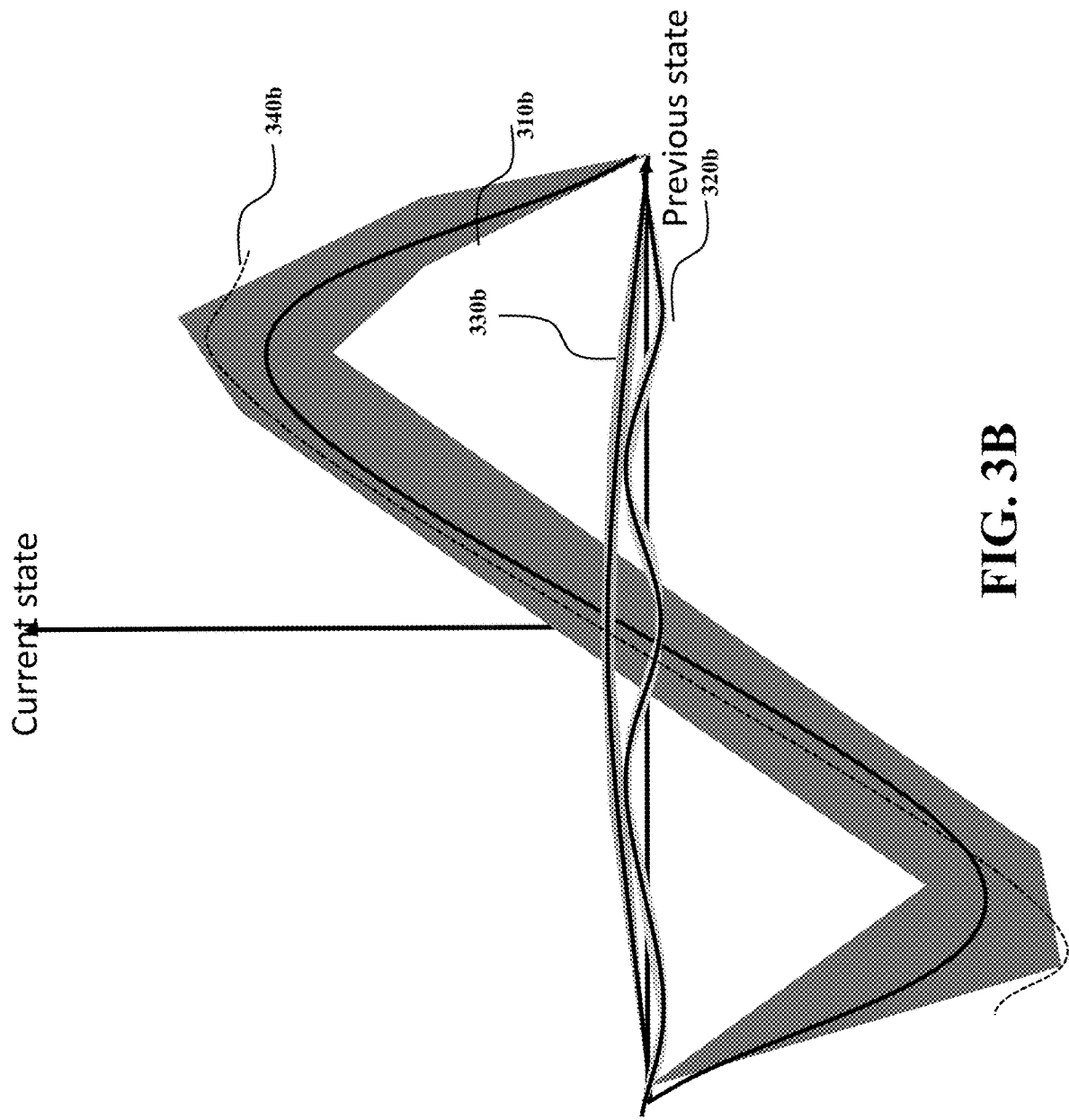
FIG. 3B shows an illustration of the influence of the weights of the basis functions for a subset of the motion model in accordance with some embodiments.

FIG. 3B shows an illustration of the influence of the weights of the basis functions for a subset of the motion model 340*b*, in accordance with some embodiments. By letting the weights of functions 320*b* and 330*b* be very small, and the weight of 310*b* be large, the basis function expansion can reproduce the motion model 340*b* with only one basis function. Although FIG. 3B is a simplified schematic, it illustrates the principles of basis functions and the computational efficiency it can have.

In other embodiments, the motion model is a Gaussian process modeled as a weighted combination of a set of basis functions wherein each weight of each function has a Gaussian probability distribution, and wherein to update the probability distribution of the tire friction function the processor is configured to update the Gaussian probability distribution of at least some weights of the weighted combination of the set of basis functions. For instance, one embodiment models the motion model as f(x)~$\mathcal{GP}$ (0, κ(x, x')), wherein the covariance function κ(x, x') of the Gaussian process is formulated in terms of Laplace operators, $$\kappa_\theta(x, x') \approx \sum_{j_1,\ldots,j_d=1} S_\theta(\lambda^{j_1,\ldots,j_d})\phi^{j_1,\ldots,j_d}(x)\phi^{j_1,\ldots,j_d}(x').$$

With basis functions $$\phi^{j_1,\ldots,j_d} = \prod_{n=1}^{d} \frac{1}{\sqrt{L_n}} \sin\left(\frac{\pi j_n (x_n + L_n)}{2L_n}\right),$$

the motion model is $$f(x) \approx \sum_j \gamma^j \phi^j(x),$$

where the weights are Gaussian distributed, $\gamma^j \sim \mathcal{N}(0, S(\lambda^j))$.

One embodiment recognizes that using weighted basis functions can be used to model the motion of the system as $$x_{k+1} = \underbrace{\begin{bmatrix} \gamma_1^1 & \cdots & \gamma_1^m \\ \vdots & & \vdots \\ \gamma_d^1 & \cdots & \gamma_d^m \end{bmatrix}}_{A} \underbrace{\begin{bmatrix} \phi^1(x_k) \\ \vdots \\ \phi^m(x_k) \end{bmatrix}}_{\varphi(x_k)} + w_k,$$

Wherein A is the matrix of weights and φ(x_k) is the vector of basis functions as a function of the state of the system.

Figure 3C:
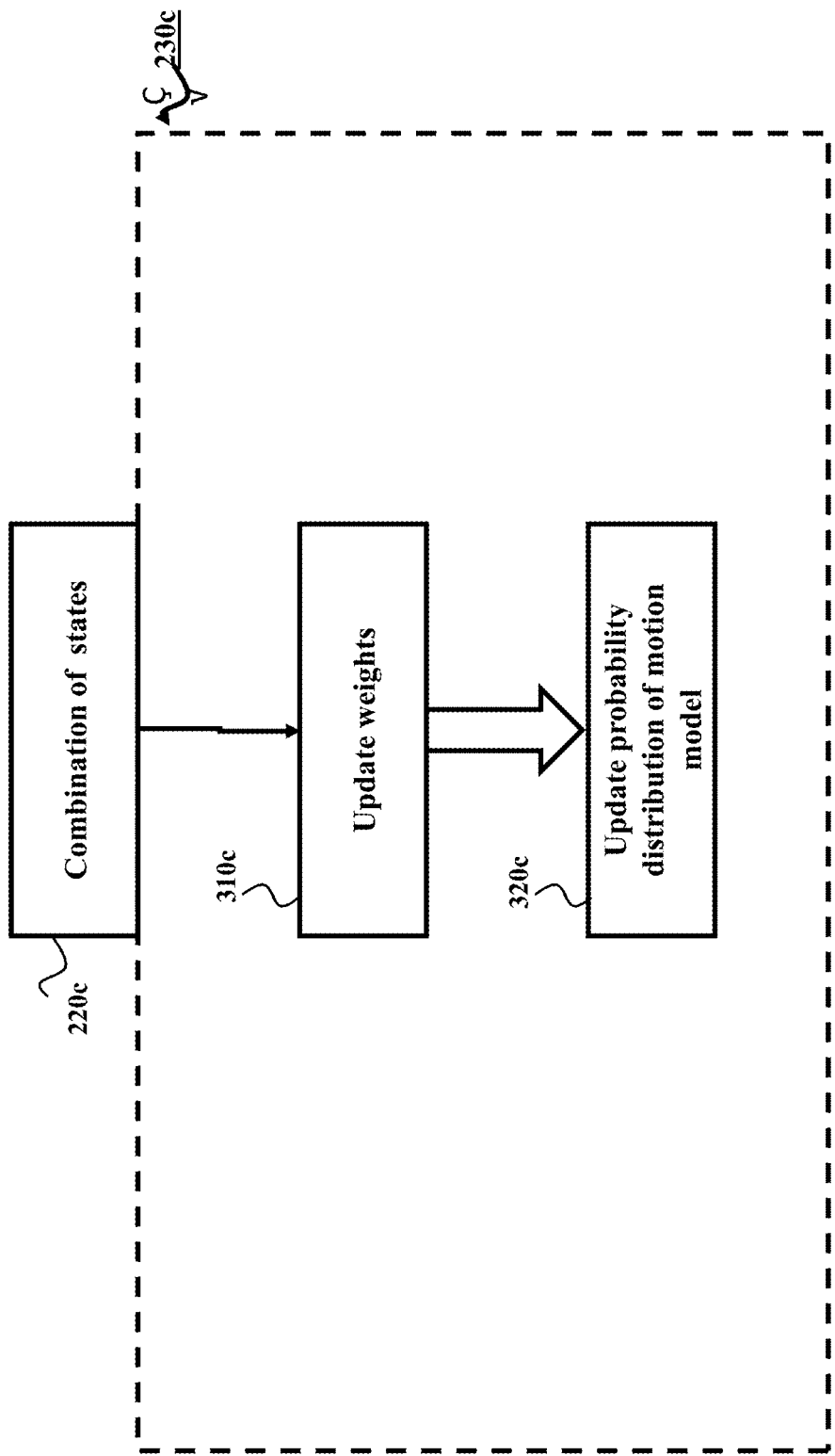
FIG. 3C shows a block diagram of one iteration of a method for updating the probability distribution of motion model for each particle according to one embodiment.

FIG. 3C shows a block diagram of one iteration of a method for updating 230c the probability distribution of motion model for each particle according to one embodiment. The method updates 310c the weights of the weighted combination of basis functions using the determined combination of current and previous state 220c and updates the probability distribution 320c of the motion model according to the weighted combination of the basis functions weighted with the updated weights.

Figure 3D:
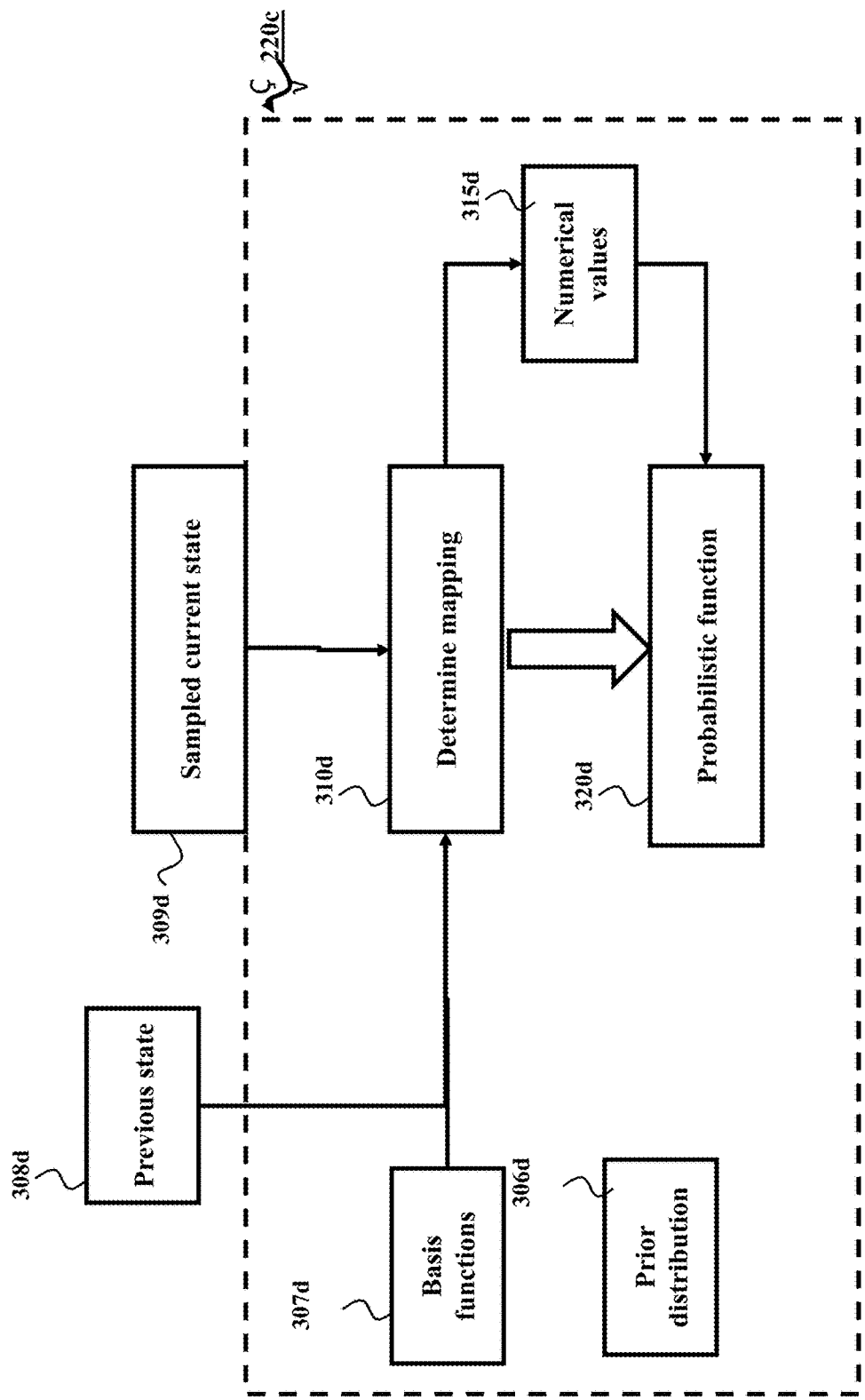
FIG. 3D shows a block diagram of a method for determining the combination of states for updating the weights of the weighted combination of basis functions for each particle according to one embodiment.

FIG. 3D shows a block diagram of a method for determining the combination of states 220c for updating the weights of the weighted combination of basis functions for each particle according to one embodiment.

Using the current sampled state 309d and the previous state 308d inserted into the basis functions 307d, the method maps current sampled state 309d and the previous state 308d inserted into the basis functions 307d to a set of numerical values 315d stored in matrices. Then, the method uses the determined numerical values 315d and a probabilistic function 320d mapping the numerical values 315d to a distribution of the weights.

In one embodiment, the probabilistic function is a matrix-Normal distribution parametrized by the numerical values 315d, that is, $A \sim \mathcal{MN}(0, Q V)$. In another embodiment, the process noise is parametrized as an inverse Wishart distribution, $Q \sim \mathcal{IW}(\ell_Q, \Lambda_Q)$. Updating the weights of basis functions and possibly also the process noise covariance is updating as a function of the state and measurement sequence as $$p(Q_k|x_{0:k},y_{0:k}) = \mathcal{IW}(Q_k|\bar{v}_{k|k}, \bar{\Lambda}_{k|k}) \text{ and}$$

$$p(A|Q_k,x_{0:k},y_{0:k}) = \mathcal{MN}(A|\bar{M}_{k|k}, Q_k \bar{\Sigma}_{k|k}^{-1}),$$

with the initialization, $M_0=0, \Sigma_0=V, \psi_0=0, \Phi_0=0$, wherein $\bar{M}_{k|k} = \bar{\psi}_{k|k} \bar{\Sigma}_{k|k}^{-1}$, $\bar{v}_{k|k} = \bar{v}_{k|k-1} + 1$, $\bar{\Lambda}_{k|k} = \Lambda_0 + \bar{\Phi}_{k|k} - \bar{M}_{k|k}\bar{\psi}_{k|k}^T$, $\bar{\Sigma}_{k|k} = \bar{\Sigma}_{k|k-1} + \varphi(x_{k-1})\varphi(x_{k-1})^T$, $\bar{\Phi}_{k|k} = \bar{\psi}_{k|k-1}\bar{M}_{k|k-1}^T + x_k x_k^T$, $\bar{\psi}_{k|k} = \bar{\psi}_{k|k-1} + x_k \varphi(x_{k-1})^T$, are determined from the state as a static mapping from the determined state trajectory to updated weights of basis functions.

Some embodiments are based on realization that when the variance of a Gaussian distribution of the process noise and/or the measurement noise is unknown, the distribution of the process noise and/or the measurement noise should be Student-t distribution, even when the actual distribution of the process noise and/or the measurement noise is Gaussian. This is because, the Student-t distribution can better capture the uncertainty of the unknown variance of the Gaussian distribution.

Figure 4A:
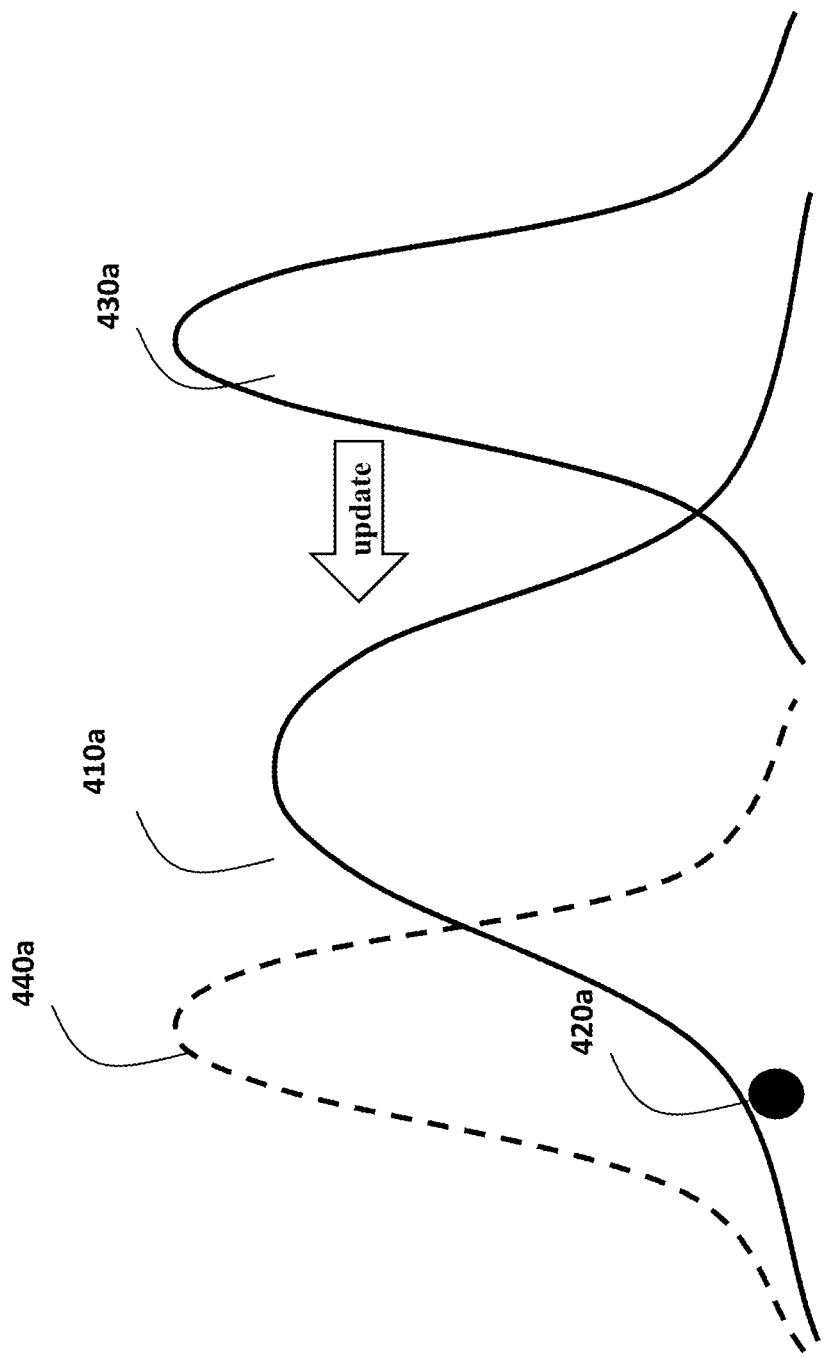
FIG. 4A shows a Gaussian distribution and a measurement according to one embodiment.

FIG. 4A shows a Gaussian distribution 410a and a measurement 420a, where the probabilistic parameters of the Gaussian distribution 410a are unknown, and where the measurement 420a originates from 410a according to one embodiment. The measurement 420a is not close to the center of 410a, but has a nonnegligible probability of occurring. However, the measurement 420a is modeled to have originated from the Gaussian distribution 430a, for which the measurement has a close to zero probability with the current estimates of probabilistic parameters of 430a, and the result will be that the state estimator will move the state estimate and the distribution 440a associated with 420a in the wrong way.

Figure 4B:
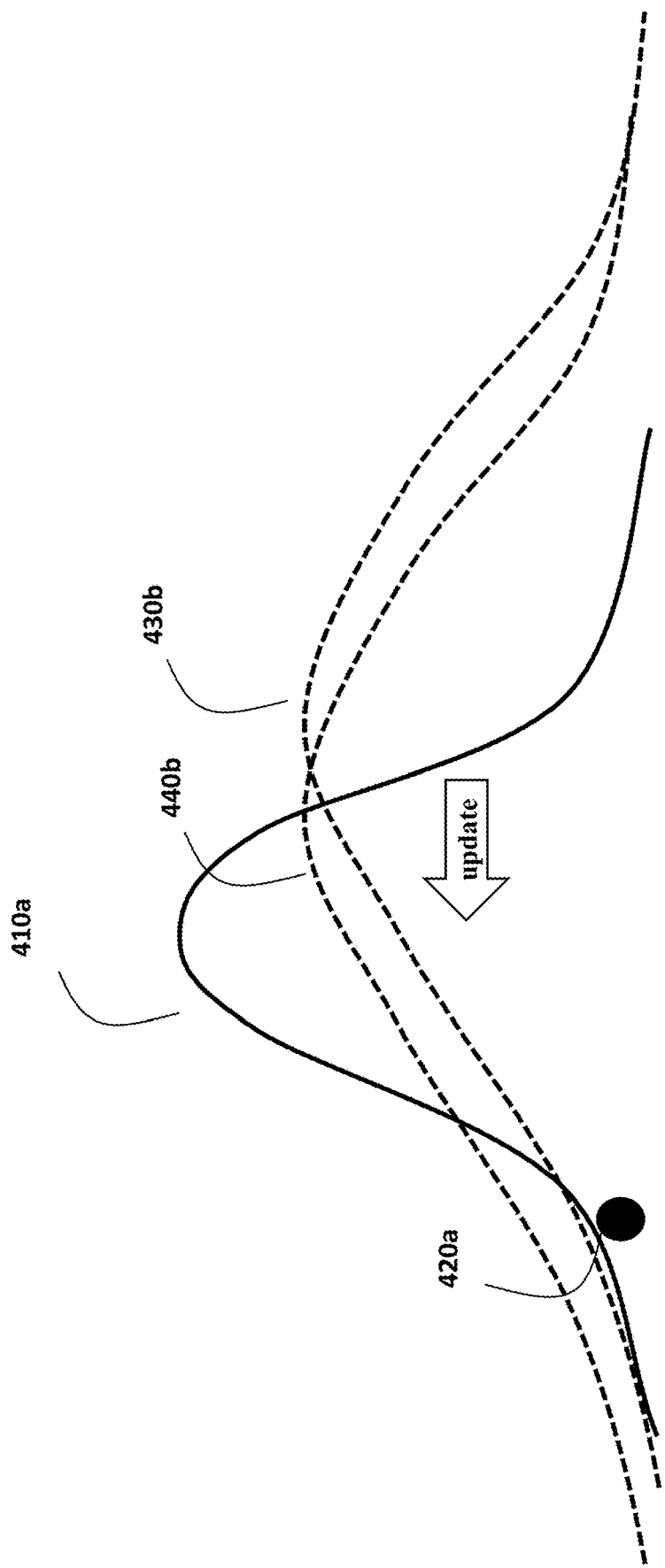
FIG. 4B shows a Gaussian distribution and a measurement according to another embodiment.

FIG. 4B shows a Gaussian distribution 410a and a measurement 420a, where the probabilistic parameters of the Gaussian distribution 410a are unknown, and where the measurement 420a originates from 410a according to another embodiment. The measurement 420a is not close to the center of 410a, but has a nonnegligible probability of occurring. However, the measurement 420a is in the estimator modeled to have originated from the Student-t distribution 430b, for which the measurement has a nonzero probability since the tails of the Student-t 430b covers the measurement 420a, and the result is that the particle filter determines the state estimate and the distribution 440b in a better way.

Figure 4C:
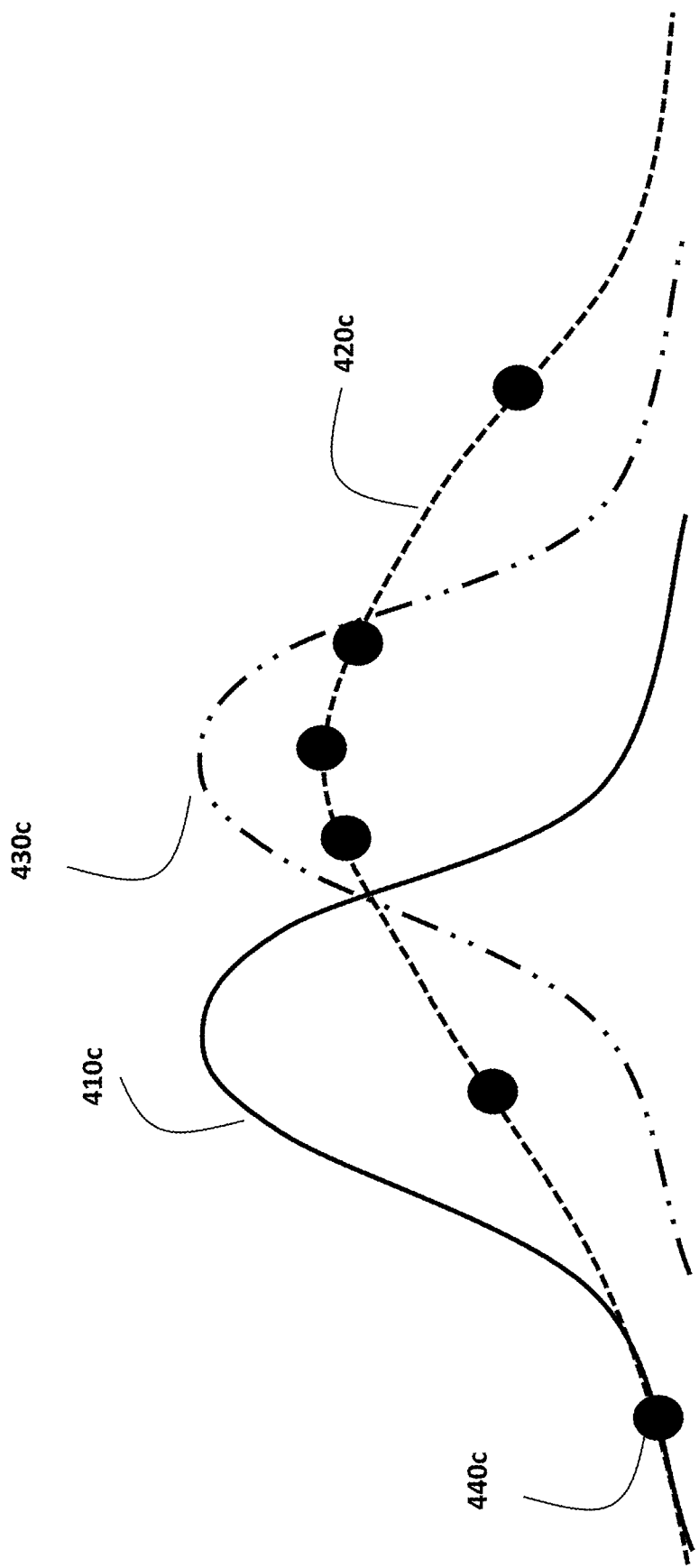
FIG. 4C shows an illustration of the effect of using the Student-t distribution to determine the sampled state according to one embodiment.

FIG. 4C shows an illustration of the effect of using the Student-t distribution to determine the sampled state according to one embodiment. The true motion model 410c is Gaussian distributed. Two different ways to determine the next state in the particle filter are illustrated; using a Student-t distribution 420c and using a Gaussian distribution 430c. The particle filter samples the current state 440c five times using the uncertainty of the motion model modeled as a Student-t distribution. The Student-t distribution is heavy tailed, so even though the estimated distribution of the motion model is not the same as the true one 410c, there is still a good chance that particles that are consistent with the motion model are generated.

Figure 4D:
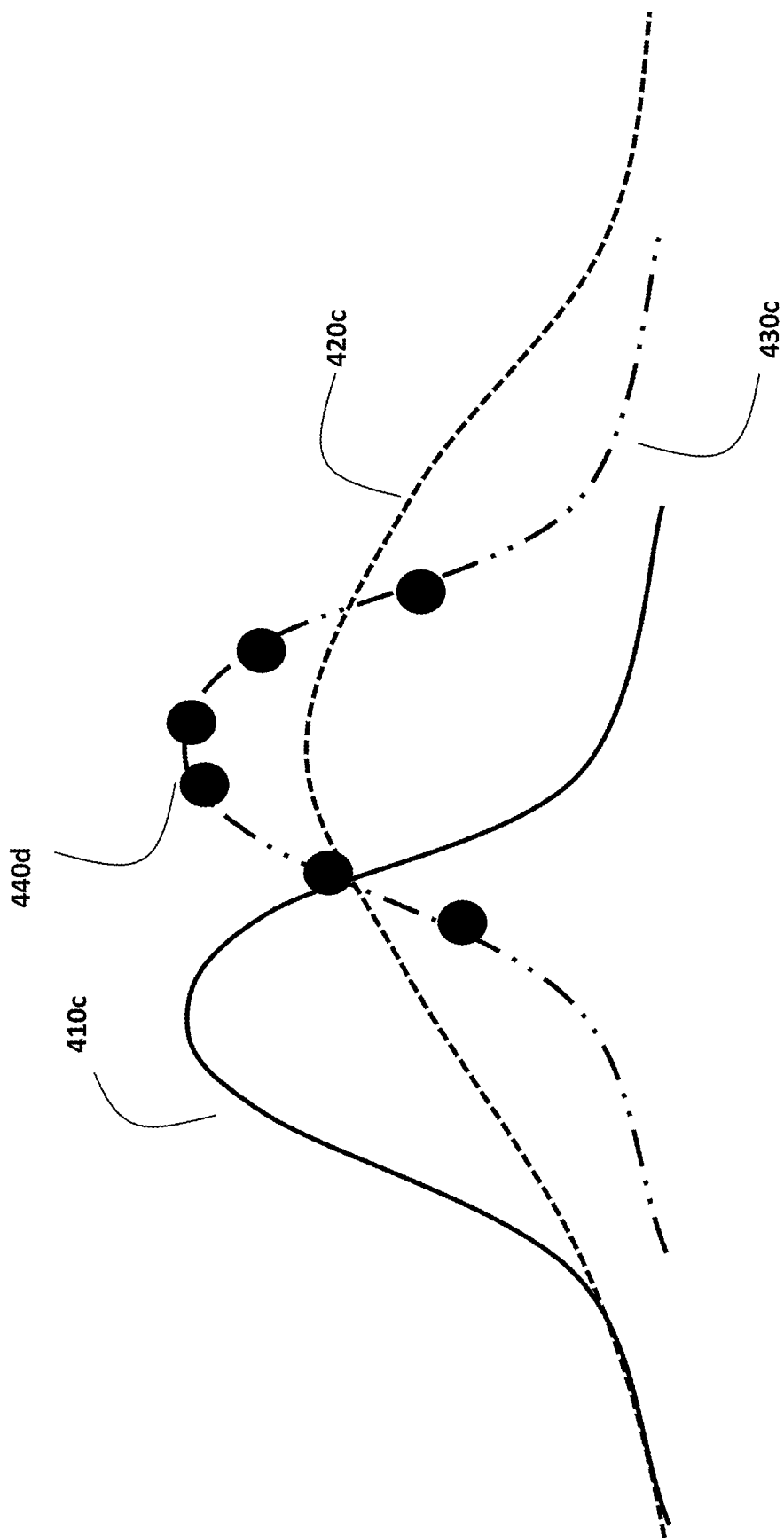
FIG. 4D shows an exemplar scenario generated from the Gaussian distribution according to one embodiment.

FIG. 4D shows the same scenario but with the sampled states 440d generated from the Gaussian distribution 430c according to one embodiment. Since the Gaussian distribution has a shorter tail, i.e., is not as wide, there is a smaller chance that a sampled particle is consistent with the true motion model.

Consequently, one embodiment determines the sampled state of each particle by sampling from the Student-t distribution centered around the mean of the Gaussian process for that particle to produce the next state, wherein the width of the Student-t distribution is determined from the uncertainty of the motion model.

Figure 5A:
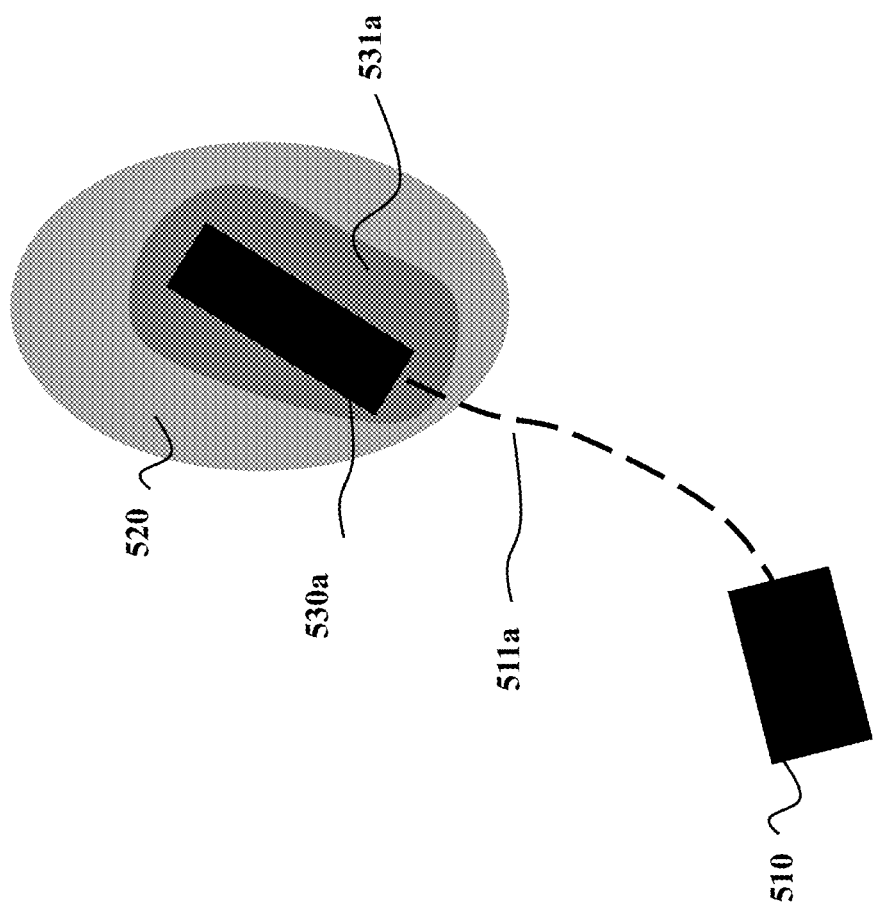
FIG. 5A and FIG. 5B show schematics illustrating principles of some embodiments.

FIG. 5A shows schematic illustrating principles of some embodiments. Specifically, to illustrate why a properly determined state trajectory can recursively determine motion model, FIG. 5A shows a scenario where a dynamical system in the form of a vehicle has an initial state 510. For one sampled state, sampled from the probability distribution of the motion model and a given input to the system, the vehicle obeys the motion 511a and ends up in 530a, with resulting uncertainty 531a. The inherent uncertainty in the sensor measurement arising due to noise, bias in sensors, and remaining sensor errors, leads to that the state of the vehicle can only be known up to a certain area 520. However, the end state of the vehicle 530a well resides within the area 520, so this particular combination of motion model and initial state of the vehicle, is given a high probability of being a good combination. Hence, the probability distribution of the motion model is likely to be a good distribution, since the sample of the current state is a sample from said distribution.

Figure 5B:
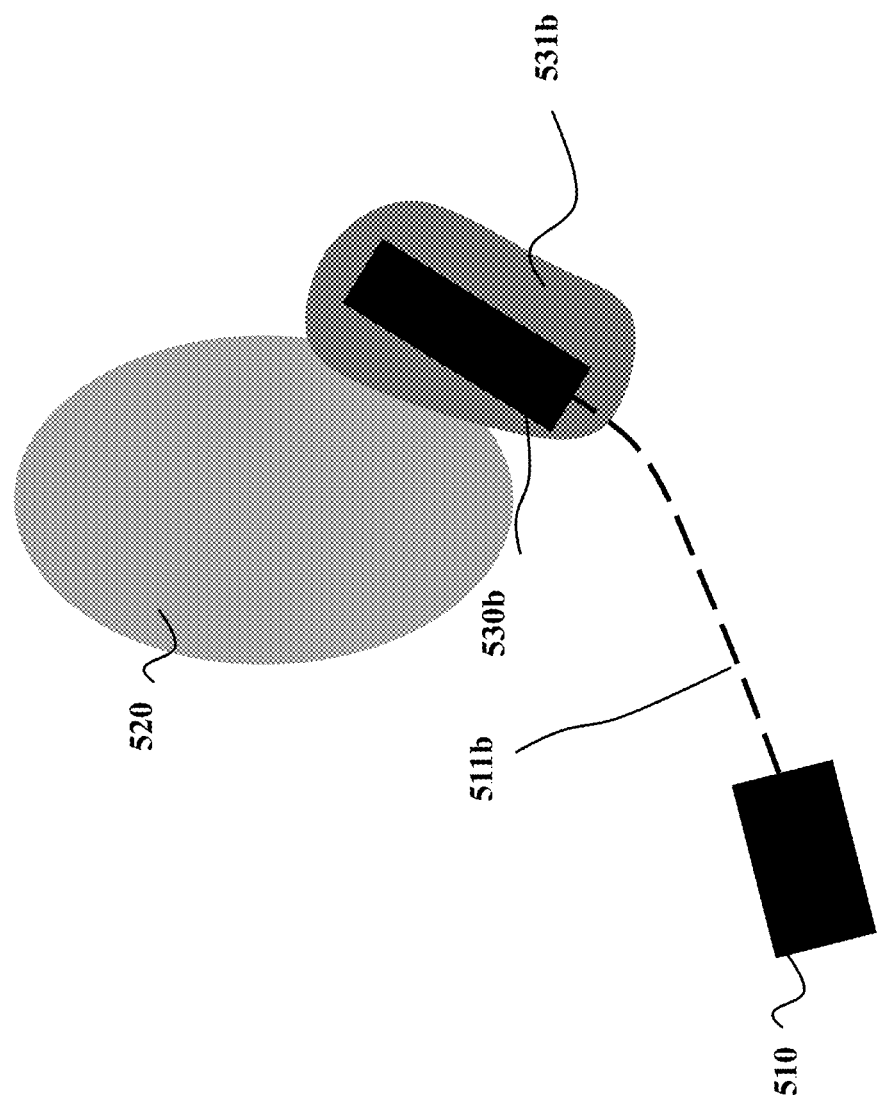

FIG. 5B shows a vehicle with the same initial state 510, possibly with the same bias terms of the sensors, but with another particular sampled current state according to some embodiments. For the same inputs to the system, the vehicle 510 now obeys the motion 511b, leading to that the vehicle ends up in state 530b, with resulting uncertainty 531b. However, this end state 530b of the vehicle does not reside within the certainty area of the sensors. Thus, this particular combination of initial state, sampled current state, and bias terms, is assigned a low probability of being a good combination. Hence, the estimated distribution of the motion model is less likely to be a good distribution.

Figure 6A:
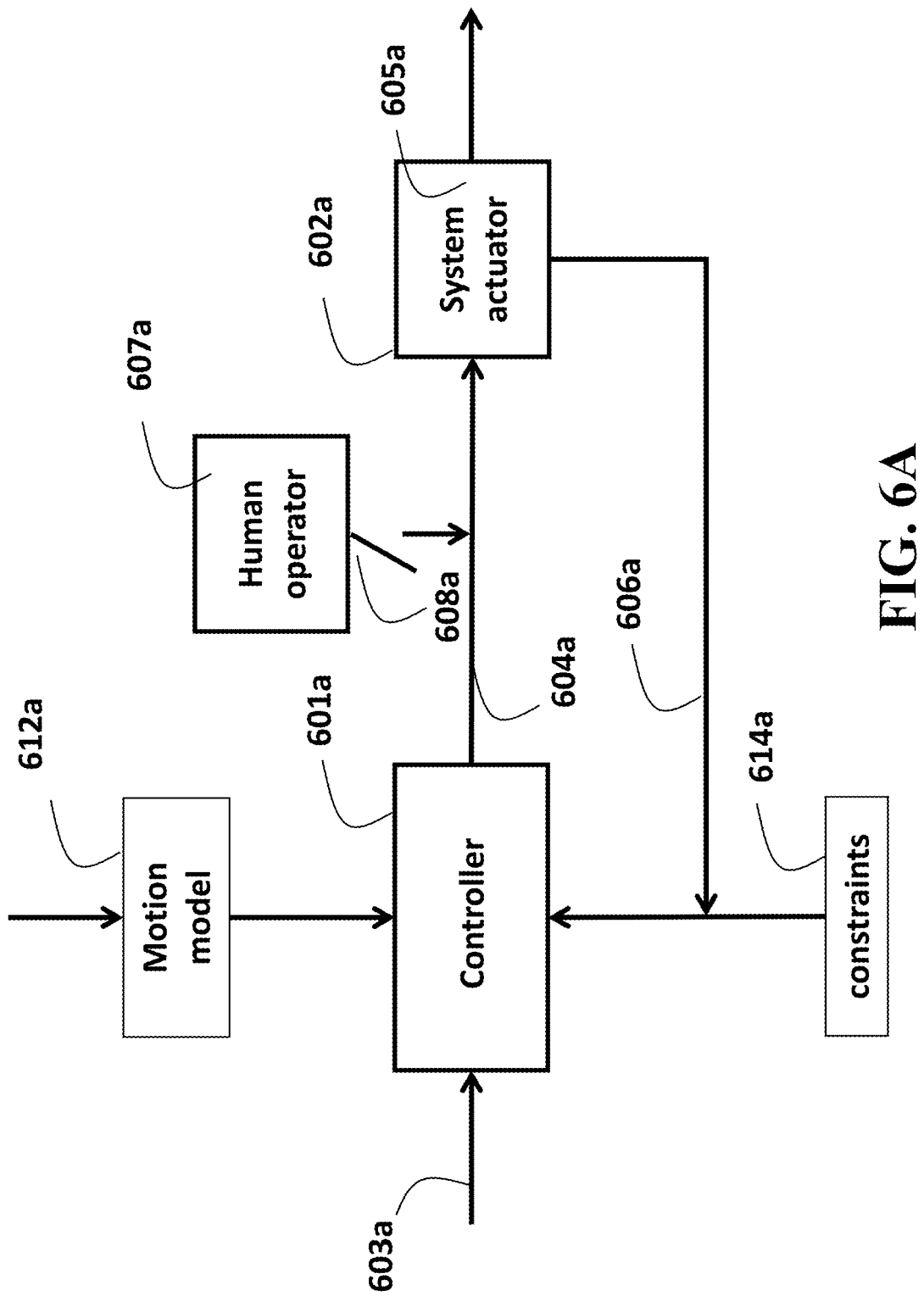
FIG. 6A shows a block diagram for how the selected parameters interact with various controllers for controlling a system according to some embodiments.

FIG. 6A shows a block diagram for how the determined motion model interacts with various controllers for controlling a system according to some embodiments. The controller 610a is a model-based controller that uses a motion model 612a to generate control command 604a to actuators 602a of the controlled system. For instance, the controller can be a proportional-integral-derivative (PID) controller, or the controller 610a can be a model-predictive controller (MPC). The controller 610a can either be a stand-alone controller or complementing actions of a human operator 607a of the system. For instance, the system can be a vehicle and the human operator can be a driver of the vehicle. The controller receives a reference 603a, state and input constraints 614a, and the motion model 612a, and generates a desired control command 604a of the wheel to control the lateral motion, and/or a desired velocity or acceleration 804a to control the system according to the reference 603a.

In one embodiment, a nonlinear model predictive controller (NMPC) controls a system using the determined motion model. An MPC operates by optimizing a desired future behavior 603a of the system in presence of constraints 614a. The MPC uses an internal prediction model using the motion model 612a and optimizes the system behavior given model 612a. In such a case, the MPC determines the optimal control commands to obtain an optimal state trajectory. In order to do this, the variation of the state over the prediction horizon is determined using the motion model defining the relation between a previous state of the system with a current state of the system.

In one embodiment, the control command is determined by solving a tracking-type optimal control problem formulation $$\min_{X,U} \frac{T}{N} \sum_{i=0}^{N-1} \|F_{ref}(x_i) - y_{ref}(\tau_i, d)\|_W^2 + \|x_i - x_{ref}\|_Q^2 +$$
$$\|u_i - u_{ref}\|_R^2 + \|F_{ref}(x_N) - y_{ref}(\tau_N, d)\|_{W_N}^2 + \|x_N - x_{ref}\|_{Q_N}^2$$
$$\text{s.t.} \quad x_0 = \hat{x}_0,$$
$$x_{i+1} = F_i(x_i, u_i), \quad i = 0, \ldots, N-1,$$
$$0 \geq h(x_i, u_i), \quad i = 0, \ldots, N-1,$$
$$0 \geq r(x_N),$$

where $x_{i+1} = F_i(x_i, u_i)$ is the discrete-time motion model 612a and $0 \geq h(x_i, u_i)$,
$0 \geq r(x_N)$, are the constraints 614a. The optimal control problem is known as a nonlinear programming (NLP), and there are various methods to solve this problem.

In one embodiment, the NLP is solved using sequential quadratic programming (SQP) using real-time iterations (RTIs). The RTI approach is based on one SQP iteration per control time step, and using a continuation-based warm starting of the state and control trajectories from one time step to the next. Each iteration consists of two steps:

(1) Preparation phase: discretize and linearize the system dynamics, linearize the remaining constraint functions, and evaluate the quadratic objective approximation to build the optimal control structured QP subproblem.
(2) Feedback phase: solve the QP to update the current values for all optimization variables and obtain the next control input to apply feedback to the system.

Another embodiment uses blockstructured factorization techniques with low-rank updates to preconditioning of an iterative solver within a primal active-set algorithm. This results in a relatively simple to implement, but computationally efficient and reliable QP solver that is suitable for embedded control hardware.

Some embodiments are based on the recognition that the controller can use a measure of uncertainty of the system state and system model. For instance, in a stochastic MPC it is possible to incorporate uncertainty into the problem formulation such that the system is cautious in regions of the state space where the uncertainty is large.

Figure 6B:
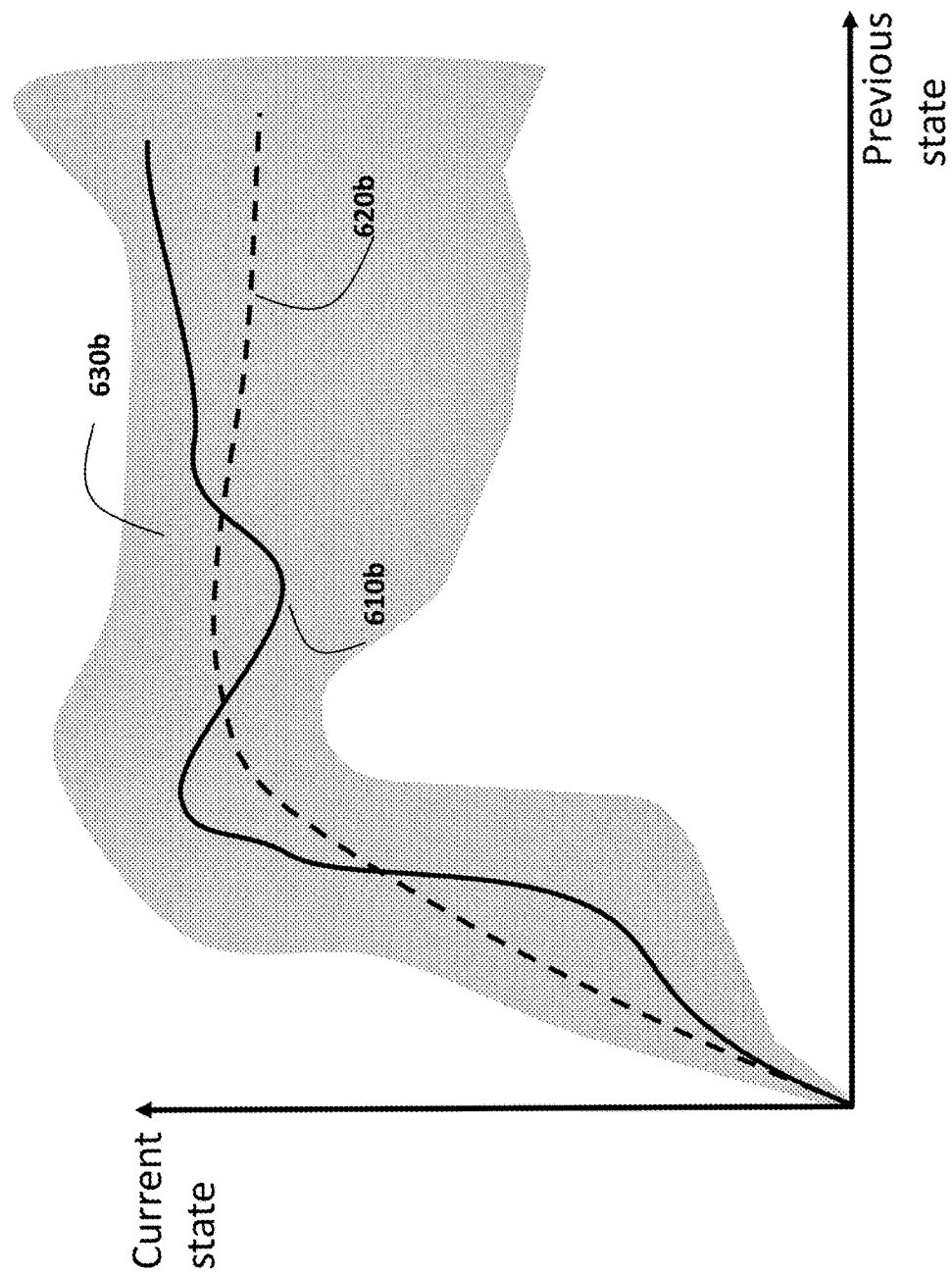
FIG. 6B shows an illustration of a method for using the determined distribution of the motion model to control a system according to one embodiment.

FIG. 6B shows an illustration of a method for using the determined distribution of the motion model to control a system according to one embodiment. The true motion model 620b is not represented very well by the estimated motion model 610b, since there are few data points to use, because the execution of the particle filter has just begun. This is indicated by the uncertainty estimate 630b of the motion model, which is significant. Consequently, a controller of the system takes this into account, by designing the controller such that the system is stable for all possible motion model uncertainties indicated by the area 630b.

Figure 6C:
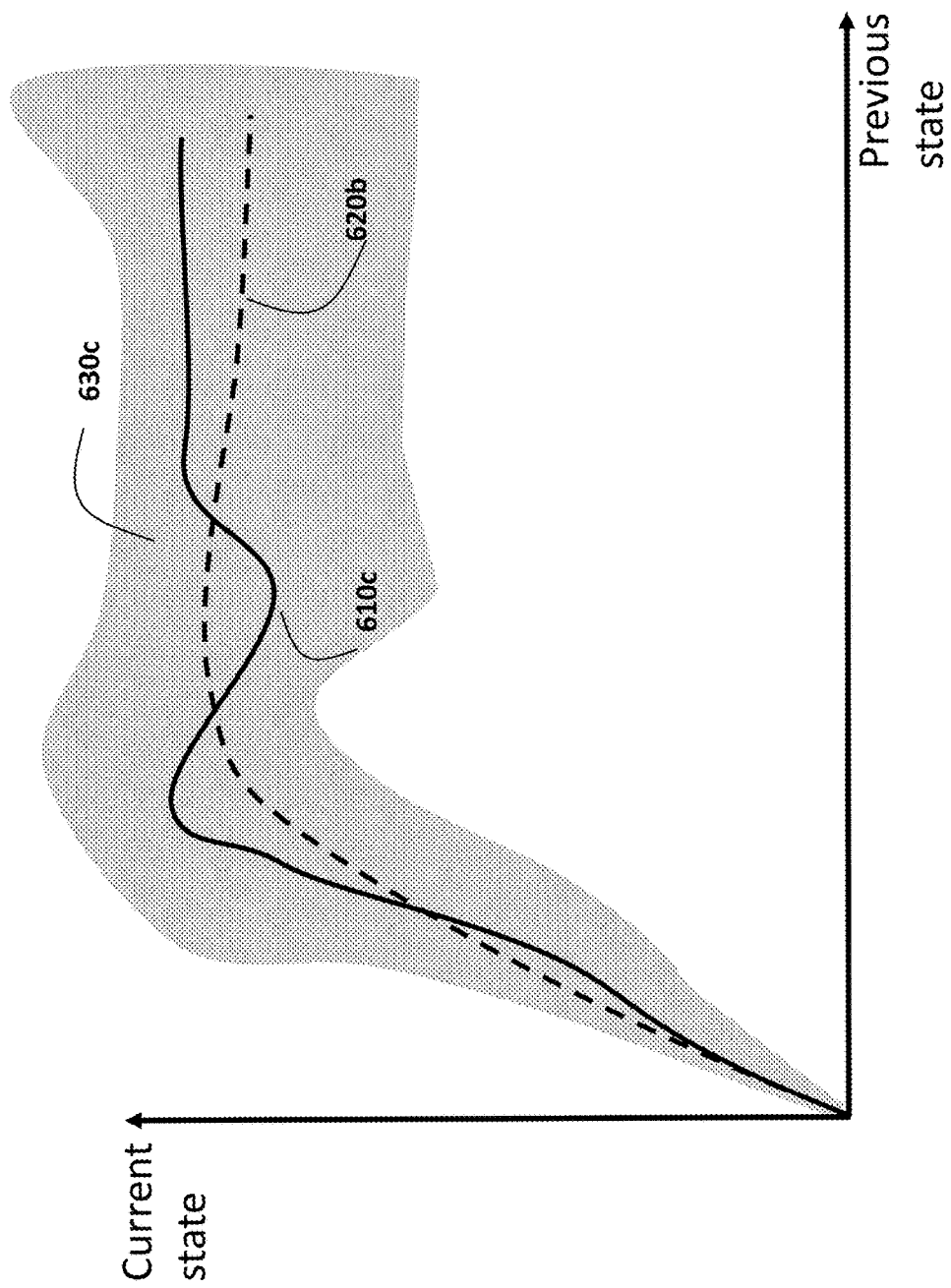
FIGS. 6C, 6D and 6E show time progression of estimations according to some embodiments.
Figure 6D:
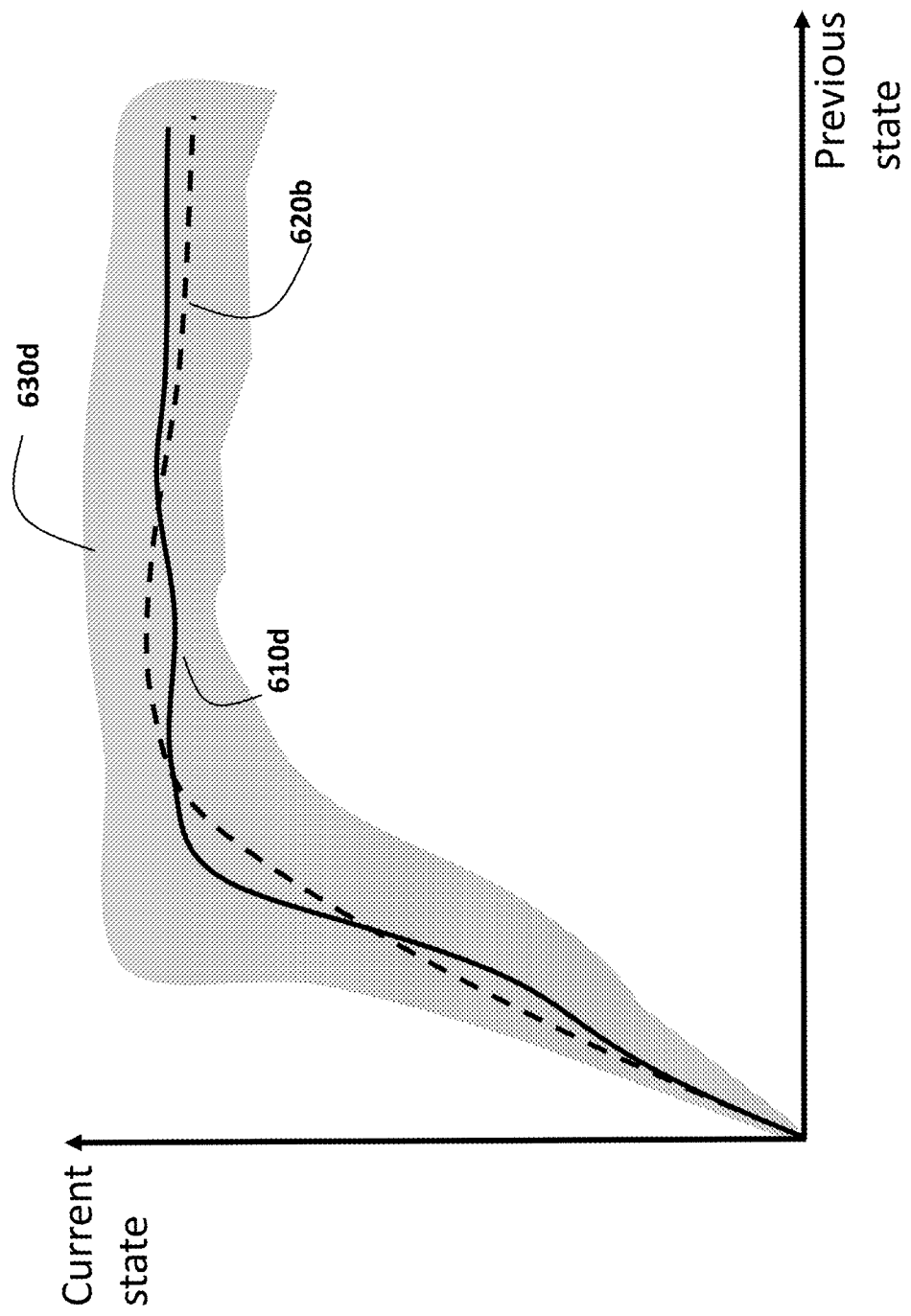
Figure 6E:
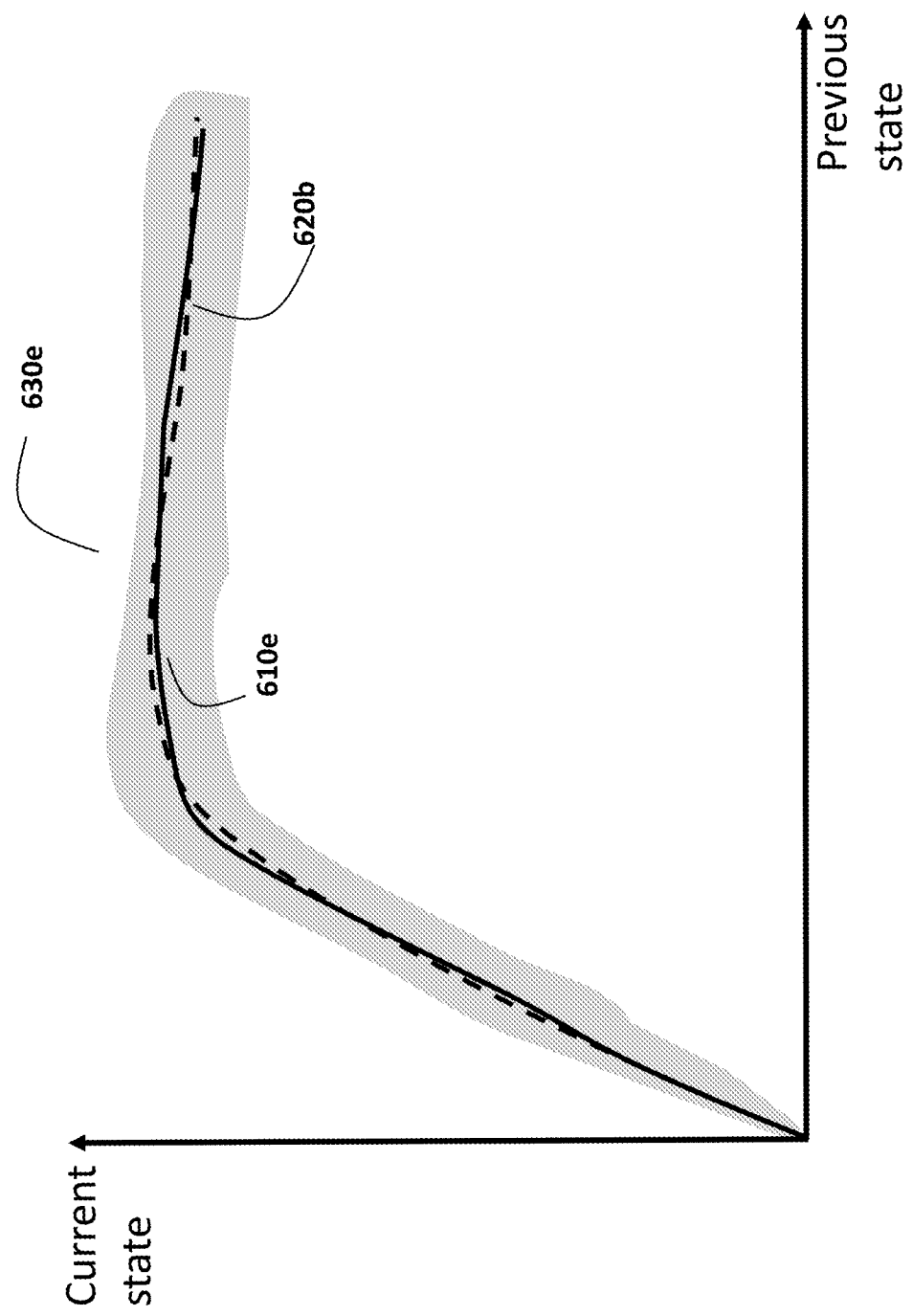

FIGS. 6C, 6D and 6E show time progression of estimations according to some embodiments. Specifically, as time progresses and more measurements become available, the estimate 610c, 610d and 610e of the motion model becomes better and the uncertainty 630c, 630d and 610e of the motion model shrinks.

Consequently, in one embodiment the controller is designed such that it adapts its behavior to the uncertainty of the motion model. For instance, robust control invariant sets are designed such that the controller becomes more and more conservative the larger the uncertainty is.

Figure 7A:
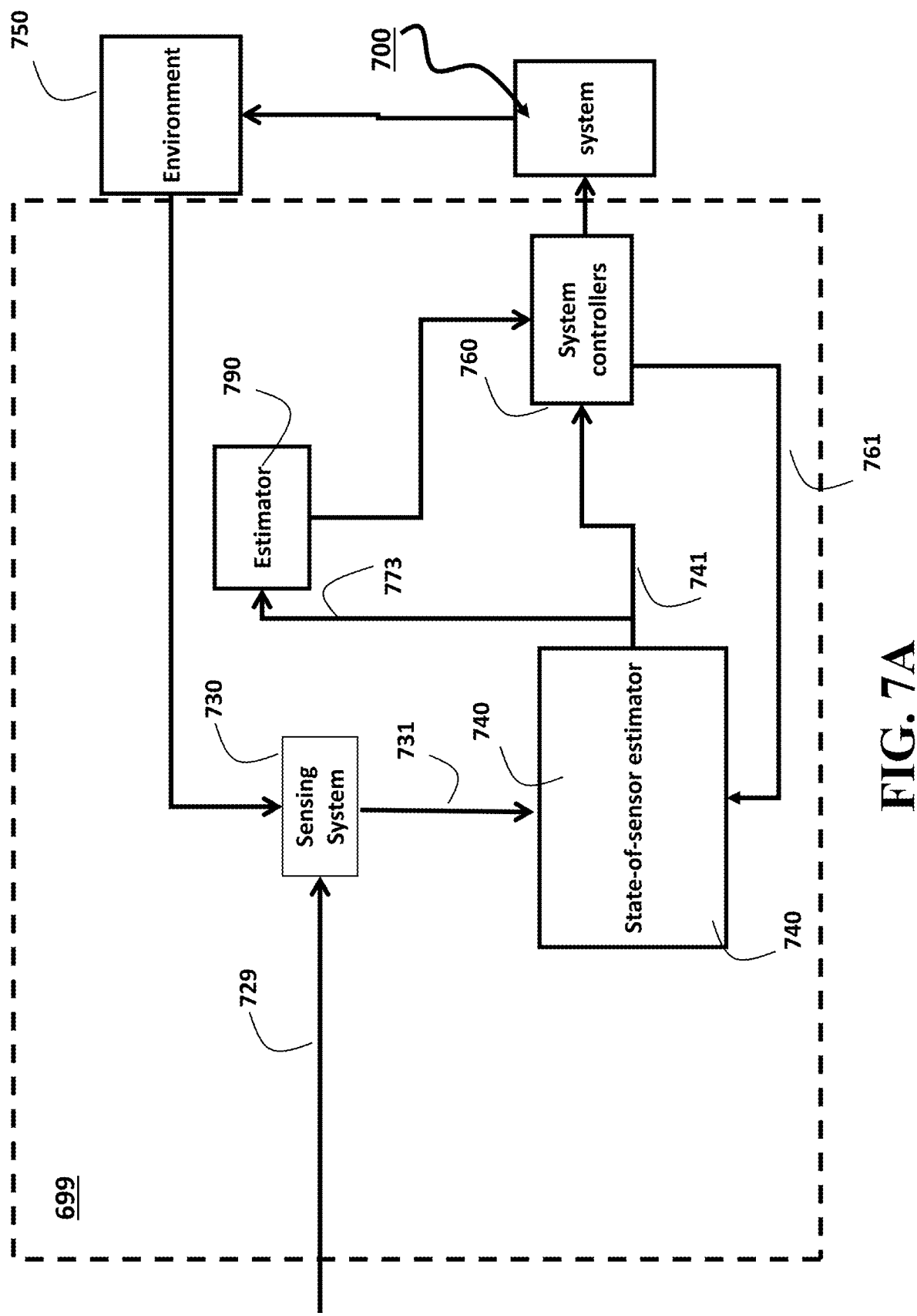
FIG. 7A shows a general block diagram of a control system according to some embodiments.

FIG. 7A shows a general block diagram of a control system 699 according to some embodiments. Different component of the control system 699 can be implemented using one or several processors operatively connected to a memory and/or various types of sensors of the system. The control system 699 can be internal to the system 700 and the implementation of the different components of the control system 699 in general depends on the type of the system.

The control system 699 can include a sensing system 730 that measures information about the motion of at least some parts of the system. The sensing system 730 can also receive sensing information 729 from external sources.

The control system 199 also includes a state-of-sensor estimator 740 for extracting valuable information about the sensor state. In some embodiments of the invention, the state-of-sensor estimator iteratively determines the internal states of the sensors, such as biases of the sensors and variances of the sensors. In addition, the information parser 740 can determine roadway information such as bank angle and/or roll angle, provided that the sensing system 730 includes inertial sensors, i.e., pitch and roll angle and/or rate sensors. Additionally or alternatively, the sensing system can include a differential GPS.

The state-of-sensor estimator 740 uses information 731 from the sensing system. The state-of-sensor estimator 740 can also receive information 761 about the system motion from the system-control units 760. The information can include a state of the system, and is received either from hardware or software, connected directly or remotely to the machine.

For example, the state-of-sensor estimator can output the state of sensor 741 including offset values, certainty levels of the offsets, and variances of the noise of the measurements, or combinations thereof. The control system 699 also includes system controllers 760 that use the state of sensor information 741. For example, if the system is a road vehicle, in one embodiment, the offset is used in an advanced driver-assistance system (ADAS) that utilizes a model of the dynamics of the vehicle, which depends on the state of offsets of the sensors. In such a case, the vehicle controllers 760 can include stand-alone components, or a combination of vehicle controllers that enable autonomous driving features. The offsets and variances, which describe the state of sensor, can be used as input to estimators 790 of the vehicle, for example, a state estimator.

The state of sensor estimator is used by the motion model estimator 790 of the control system to aid in determining the motion model according to some embodiments of the invention. The motion model is used by various embodiments to control the system using the controllers 760.

Figure 7B:
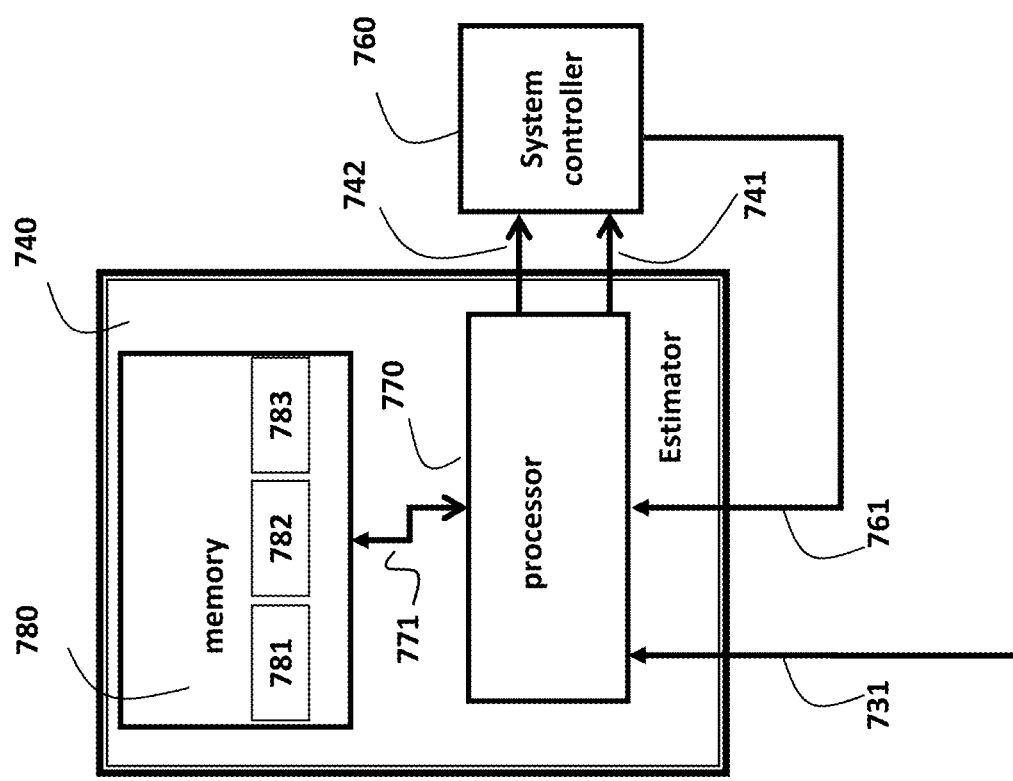
FIG. 7B shows a general structure of the state-of-sensor estimator according to one embodiment.

FIG. 7B shows a general structure of the state-of-sensor estimator 740 according to one embodiment. The state-of-sensor estimator 740 includes at least one processor 770 for executing modules of the state-of-sensor estimator 740. The processor 770 is connected 771 to a memory 780 that stores the statistics 781 of the sensor states and parameters and the system information 782, such as the currently determined motion model and a measurement model. The memory 780 also stores 783 the internal information of the estimator, including, but not limited to, values of the state of sensor, values of each computed state of the system, and the motion leading up to each state of the system. In some embodiments, the information on the system is updated 771 based on information received from the system 761 and the sensing 731.

Figure 8A:
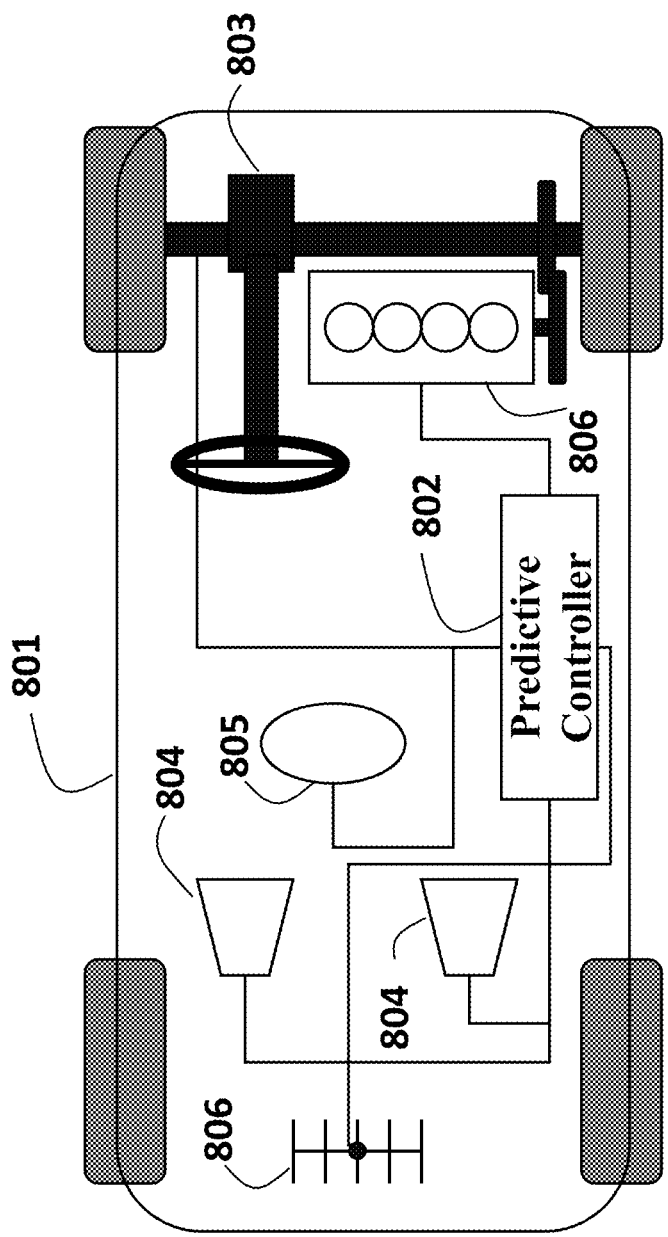
FIG. 8A shows a schematic of a vehicle including a predictive controller employing principles of some embodiments.

FIG. 8A shows a schematic of a vehicle 801 including a predictive controller 802 employing principles of some embodiments. As used herein, the vehicle 801 can be any type of wheeled vehicle, such as a passenger car, bus, or rover. Also, the vehicle 801 can be an autonomous or semi-autonomous vehicle. For example, some embodiments control the motion of the vehicle 801. Examples of the motion include lateral motion of the vehicle controlled by a steering system 803 of the vehicle 801. In one embodiment, the steering system 803 is controlled by the controller 802. Additionally or alternatively, the steering system 803 can be controlled by a driver of the vehicle 801.

The vehicle can also include an engine 806, which can be controlled by the controller 802 or by other components of the vehicle 801. The vehicle can also include one or more sensors 804 to sense the surrounding environment. Examples of the sensors 804 include distance range finders, radars, lidars, and cameras. The vehicle 801 can also include one or more sensors 805 to sense its current motion quantities and internal status. Examples of the sensors 805 include global positioning system (GPS), accelerometers, inertial measurement units, gyroscopes, shaft rotational sensors, torque sensors, deflection sensors, pressure sensor, and flow sensors. The sensors provide information to the controller 802. The vehicle can be equipped with a transceiver 806 enabling communication capabilities of the controller 802 through wired or wireless communication channels.

Figure 8B:
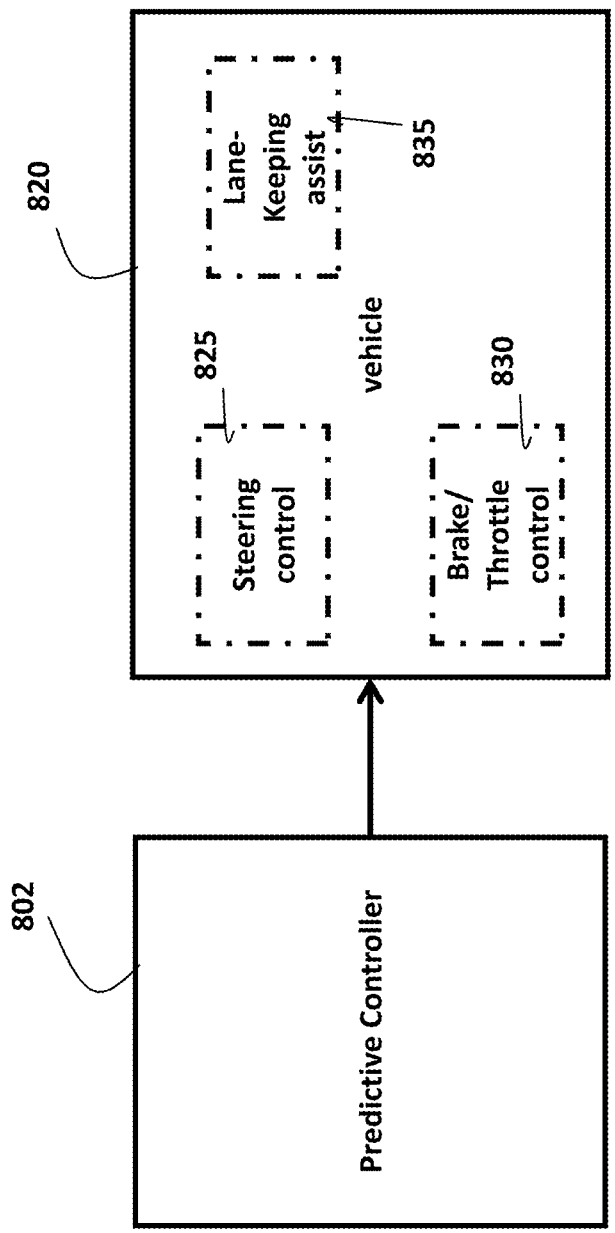
FIG. 8B shows a schematic of interaction between the predictive controller and the controllers of the vehicle according to some embodiments.

FIG. 8B shows a schematic of interaction between the predictive controller 802 and the controllers 820 of the vehicle 801 according to some embodiments. For example, in some embodiments, the controllers 820 of the vehicle 801 are steering 825 and brake/throttle controllers 830 that control rotation and acceleration of the vehicle 820. In such a case, the predictive controller 802 outputs control inputs to the controllers 825 and 830 to control the state of the vehicle. The controllers 820 can also include high-level controllers, e.g., a lane-keeping assist controller 835 that further process the control inputs of the predictive controller 802. In both cases, the controllers 820 maps use the outputs of the predictive controller 802 to control at least one actuator of the vehicle, such as the steering wheel and/or the brakes of the vehicle, in order to control the motion of the vehicle.

Figure 8C:
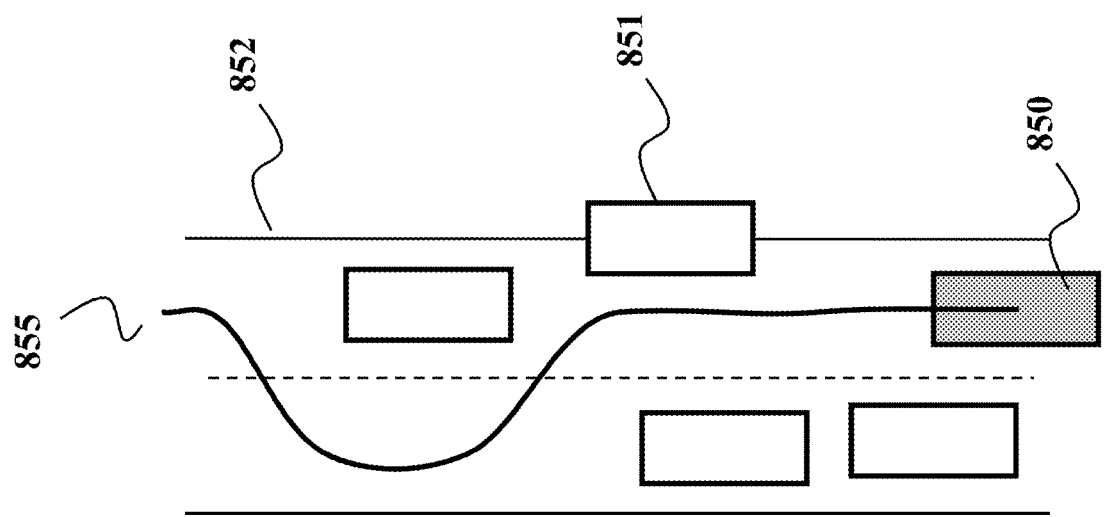
FIG. 8C shows a schematic of an autonomous or semi-autonomous controlled vehicle for which a dynamically feasible, and often optimal trajectory can be computed by using some embodiments.

FIG. 8C shows a schematic of an autonomous or semi-autonomous controlled vehicle 850 for which a dynamically feasible, and often optimal trajectory 855 can be computed by using some embodiments. The generated trajectory aims to keep the vehicle within particular road bounds 852, and aims to avoid other uncontrolled vehicles, i.e., obstacles 851 for the controlled vehicle 850. In some embodiments, each of the obstacles 851 can be represented by one or multiple inequality constraints in a time or space formulation of the mixed-integer optimal control problem, including one or multiple additional discrete variables for each of the obstacles. For example, based on embodiments configured to implement a mixed-integer model predictive controller, the autonomous or semi-autonomous controlled vehicle 850 can make discrete decisions in real time such as, e.g., pass another vehicle on the left or on the right side or instead to stay behind another vehicle within the current lane of the road 852.

In some embodiments, to control the vehicle, the control inputs include commands specifying values of one or combination of a steering angle of the wheels of the vehicle and a rotational velocity of the wheels, and the measurements include values of one or combination of a rotation rate of the vehicle and an acceleration of the vehicle. Each state of the vehicle includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. An apparatus for controlling a system, comprising:
a memory configured to store a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise, wherein the Gaussian process of each particle is parameterized as a weighted combination of a set of basis functions, wherein the distribution of the Gaussian process is a Student-t distribution having a mean defining weights of the weighted combination and a scale defining the uncertainty of the motion model of the particle, wherein the weights of the basis functions are modeled as a weight matrix, wherein the weight matrix is Matrix-Normal distributed; and
a processor configured to
execute the particle filter to produce the weight of each particle and the state of each particle determined with the uncertainty of the motion model of each particle;
update the distribution of the Gaussian process of a particle based on a difference between the state of the particle determined with the uncertainty of the motion model of the particle and a state of the particle determined without the uncertainty of the motion model of the particle;
determine a current estimate of the motion model as a weighted combination of the motion models of the particles weighted according to the weights of the particles;
determine a current estimate of the state of the system as a weighted combination of the states of the particles weighted according to the weights of the particles; and
execute a controller configured to generate a value of the control input based on the current estimate of the motion model and the current estimate of the state of the system and control the system using the value of the control input.

2. The apparatus of claim 1, wherein the execution of the particle filter samples from the Student-t distribution to produce the motion model of the system with the uncertainty.

3. The apparatus of claim 1, wherein the execution of the particle filter generates a random number sample according to the Student-t distribution, determines the state of the particle without the uncertainty of the motion model of the particle, and updates the state of the particle without the uncertainty of the motion model of the particle according to the random number to produce the state of the particle with the uncertainty of the motion model of the particle.

4. The apparatus of claim 1, wherein the state of the particle without the uncertainty of the motion model is determined by updating the state with the motion model defined by the mean of the Student-t distribution.

5. The apparatus of claim 1, wherein the controller determining the control input is a model based controller.

6. The apparatus of claim 5, wherein the model based controller adapts its control input according to the uncertainty estimate of the motion model and the uncertainty estimate of the state.

7. The apparatus of claim 1, wherein, to execute the particle filter, the processor is configured to
determine a set of particles, each particle represents the state of the system determined with a sample of the motion model drawn from a probability distribution of the motion models represented as the Gaussian process; and
compare the state of each particle from the set of particles with measurements of the state according to the measurement model to determine a weight of each particle representing an error between the state of the particle and a state trajectory indicated by the measurements.

8. The apparatus of claim 1, wherein the controlled system is a vehicle, wherein the control inputs include commands specifying values of one or combination of a steering angle of the wheels of the vehicle and a rotational velocity of the wheels, and wherein the measurements include values of one or combination of a rotation rate of the vehicle and an acceleration of the vehicle, each state includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle.

9. A method for controlling a system, wherein the method uses a processor coupled to a memory storing a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise, wherein the Gaussian process of each particle is parameterized as a weighted combination of a set of basis functions, wherein the distribution of the Gaussian process is a Student-t distribution having a mean defining weights of the weighted combination and a scale defining the uncertainty of the motion model of the particle, wherein the weights of the basis functions are modeled as a weight matrix, wherein the weight matrix is Matrix-Normal distributed, wherein the processor is coupled with stored instructions implementing the method, wherein the instructions, when executed by the processor carry out steps of the method, comprising:

executing the particle filter to produce the weight of each particle and the state of each particle determined with the uncertainty of the motion model of each particle;

updating the distribution of the Gaussian process of a particle based on a difference between the state of the particle determined with the uncertainty of the motion model of the particle and a state of the particle determined without the uncertainty of the motion model of the particle;

determining a current estimate of the motion model as a weighted combination of the motion models of the particles weighted according to the weights of the particles;

determining a current estimate of the state of the system as a weighted combination of the states of the particles weighted according to the weights of the particles; and executing a controller configured to generate a value of the control input based on the current estimate of the motion model and the current estimate of the state of the system and control the system using the value of the control input.

10. The method of claim 9, wherein the execution of the particle filter samples from the Student-t distribution to produce the motion model of the system with the uncertainty.

11. A non-transitory computer readable storage medium embodied thereon a program executable by a processor for performing a method, the medium stores a particle filter configured to estimate weights of a set of particles based on fitting of the particles into a measurement model, wherein a particle includes a motion model of the system having an uncertainty modeled as a Gaussian process over possible motion models of the system and a state of the system determined with the uncertainty of the motion model of the particle, wherein a distribution of the Gaussian process of the motion model of one particle is different from a distribution of the Gaussian process of the motion model of another particle, wherein each execution of the particle filter updates the state of the particle according to a control input to the system and the motion model of the particle with the uncertainty, and determines the weight of the particle by fitting the state of the particle in the measurement model subject to measurement noise, wherein the Gaussian process of each particle is parameterized as a weighted combination of a set of basis functions, wherein the distribution of the Gaussian process is a Student-t distribution having a mean defining weights of the weighted combination and a scale defining the uncertainty of the motion model of the particle, wherein the weights of the basis functions are modeled as a weight matrix, wherein the weight matrix is Matrix-Normal distributed, the method comprising:

executing the particle filter to produce the weight of each particle and the state of each particle determined with the uncertainty of the motion model of each particle;

updating the distribution of the Gaussian process of a particle based on a difference between the state of the particle determined with the uncertainty of the motion model of the particle and a state of the particle determined without the uncertainty of the motion model of the particle;

determining a current estimate of the motion model as a weighted combination of the motion models of the particles weighted according to the weights of the particles;

determining a current estimate of the state of the system as a weighted combination of the states of the particles weighted according to the weights of the particles; and executing a controller configured to generate a value of the control input based on the current estimate of the motion model and the current estimate of the state of the system and control the system using the value of the control input.

\* \* \* \* \*